US008205311B2

(12) United States Patent
Woellper et al.

(10) Patent No.: US 8,205,311 B2
(45) Date of Patent: Jun. 26, 2012

(54) PROCESS AND APPARATUS FOR CORNER TUCKING A COVERING SHEET OF AN UPHOLSTERED ARTICLE

(75) Inventors: Randolph Woellper, Hudsonville, MI (US); Ronald H. Brown, Holland, MI (US); Bryan Gingrich, Holland, MI (US)

(73) Assignee: Haworth, Inc., Holland, MI (US)

( * ) Notice: Subject to any disclaimer, the term of this patent is extended or adjusted under 35 U.S.C. 154(b) by 557 days.

(21) Appl. No.: 12/454,500

(22) Filed: May 19, 2009

(65) Prior Publication Data

US 2010/0293771 A1 Nov. 25, 2010

(51) Int. Cl.
*B68G 7/00* (2006.01)
*B23P 11/00* (2006.01)

(52) U.S. Cl. ... 29/91; 29/243.58; 29/243.57; 29/243.56; 29/91.1; 29/448; 29/91.5; 227/13; 227/25

(58) Field of Classification Search .................. 29/91.1, 29/91, 91.5, 91.6, 448, 243.56, 243.57, 243.58; 227/13, 25, 152, 153, 154
See application file for complete search history.

(56) References Cited

U.S. PATENT DOCUMENTS

| | | | | |
|---|---|---|---|---|
| RE17,231 | E | 3/1929 | Roline et al. | |
| 1,833,702 | A | 11/1931 | Anthony | |
| 2,489,118 | A | 11/1949 | Brinker et al. | |
| 2,576,121 | A | 11/1951 | Kamborian | |
| 2,808,099 | A | 10/1957 | Silverman | |
| 3,527,397 | A * | 9/1970 | Wortsmith, Sr. | 227/13 |
| 3,840,167 | A | 10/1974 | Otteman et al. | |
| 4,248,657 | A | 2/1981 | Henry | |
| 4,856,171 | A * | 8/1989 | Croteau | 29/417 |
| 4,995,178 | A | 2/1991 | Randolph | |
| 5,014,408 | A * | 5/1991 | Radermacher | 29/243.58 |
| 5,058,794 | A * | 10/1991 | Stanton | 227/7 |
| 5,072,496 | A | 12/1991 | Radermacher | |
| 5,118,374 | A | 6/1992 | Suwitoadji | |
| 5,129,569 | A | 7/1992 | Stanton | |
| 5,230,687 | A | 7/1993 | Lombardo et al. | |
| 5,258,083 | A * | 11/1993 | Monk et al. | 156/64 |
| 5,259,825 | A | 11/1993 | De Angelis et al. | |
| 5,603,150 | A * | 2/1997 | Assink et al. | 29/91.8 |
| 5,794,328 | A * | 8/1998 | Simone | 29/709 |
| 6,379,094 | B1 * | 4/2002 | Porat | 412/9 |
| 6,581,260 | B2 | 6/2003 | Kinney | |
| 7,478,988 | B2 * | 1/2009 | Porat | 412/4 |
| 7,574,788 | B1 * | 8/2009 | Chamlee et al. | 29/91.1 |
| 7,789,986 | B2 * | 9/2010 | Brown et al. | 156/216 |
| 8,123,449 | B2 * | 2/2012 | Porat | 412/17 |
| 2002/0046452 | A1 * | 4/2002 | Kinney | 29/91.1 |
| 2005/0180843 | A1 * | 8/2005 | Porat | 412/19 |
| 2007/0214625 | A1 * | 9/2007 | Brown et al. | 29/91.1 |
| 2009/0116935 | A1 * | 5/2009 | Porat | 412/3 |

* cited by examiner

*Primary Examiner* — Essama Omgba
(74) *Attorney, Agent, or Firm* — Flynn, Thiel, Boutell & Tanis, P.C.

(57) ABSTRACT

An apparatus and process for causing excess covering material at a workpiece corner to be gathered, folded and secured to a back side of the panel. A corner tucking apparatus includes a gathering plate positioned adjacent a positioning structure, and moves inwardly across the back side of the workpiece, from the corner, to gather and fold the corner flap. The gathering plate has a generally V-shaped notch which causes excess material to be gathered together as the plate moves inwardly. The gathered material upon reaching the apex of the notch is folded downwardly into contact with the back side of the workpiece. A securing structure which is carried inwardly with the gathering plate is then activated to fixedly secure the folded flap to the pad or workpiece.

16 Claims, 22 Drawing Sheets

PROCESS AND APPARATUS FOR CORNER TUCKING A COVERING SHEET OF AN UPHOLSTERED ARTICLE

FIELD OF THE INVENTION

This invention relates to a process and apparatus for wrapping a thin flexible covering sheet around the edges of a substrate and, more specifically, to an improved process and apparatus for tucking and securing excess covering sheet material as located at the corner of the substrate to the back side thereof to form an aesthetically pleasing covered corner.

BACKGROUND OF THE INVENTION

Wall systems defined by upright space-dividing panels are widely utilized in offices and the like to divide large open areas into smaller workspaces. Such panels, which may be of floor-to-ceiling height or of lesser height, typically are prefabricated and employ a rigid frame to which side cover pads are attached for enclosing the frame and defining the desired aesthetics of the finished wall panel. The cover pads, which may extend the full vertical height of the frame, or which may be a plurality of smaller pads which attach to the frame, typically include a sheetlike or platelike pad substrate which is exteriorly covered by a thin flexible covering sheet to provide desired functionality with respect to aesthetics, acoustics and the like. Such covering sheet in some instances constitutes a thin flexible vinyl or foil-like material, but more frequently constitutes a thin fabric which is secured to the pad substrate so that the fabric defines the exposed side surface of the assembled wall panel. While constructions of this type are conventionally utilized, the construction of such cover pads and specifically the application of a thin flexible covering sheet to the support substrate has long been an undesirably inefficient and costly process requiring a high degree of manual labor and manipulation in order to ensure that the flexible covering sheet is properly attached to its underlying substrate in a manner which ensures proper alignment of the fabric while at the same time avoiding undesired looseness, puckering or wrinkling, particularly at the corners of the pad.

In the construction of upholstered pads or panels, as aforesaid, the substrate in one conventional construction is defined by a thin sheetlike facing pad which for example may be defined by a compressed mat of fiberglass, either with or without a supporting backer, and this facing pad in turn has a rigid ring-shaped rectangular frame fixed to the back side thereof. The frame extends along the peripheral edges of the pad and is contoured to accommodate clips or fasteners which mount the pad to the wall panel frame. This substrate is then covered by the covering sheet which extends across the front face of the facing pad and is manually wrapped around the side edges of the facing pad and frame to permit adhesive securement of the covering sheet edge portions (i.e. flaps) to a rear side of the substrate, typically a rearwardly facing surface on the frame. As noted above, this is a time consuming and hence an expensive manual assembly process.

In an alternative construction of the upholstered pad or panel, a substrate can be defined by a relatively rigid platelike member, such as an MDF board, which board has the flexible covering sheet adhered directly to the front face of the substrate or has a thin compressible mat (such as of fiberglass) interposed therebetween, and the edge flaps of the flexible covering sheet are manually wrapped around the edges of the substrate and adhesively secured to the back side and/or edges thereof. This construction, which is used as a wall panel pad or as a tack board, also involves significant and costly manual assembly.

In construction of the pads or panels of the types described above, the wrapping of the flexible cover sheet around the corners of the pad or panel requires special attention and create particular difficulties since the covering material necessarily involves an excess of such material which tends to bunch together at the corners as the flaps of covering material are wrapped around the edges of the pad or panel. This bunch of excess cover material at each corner is typically manually secured by first bunching the material together and then stretching it rearwardly and substantially simultaneously folding it downwardly over the back side of the pad or panel, with this bunched and folded corner material then typically being manually fixedly secured to the back side of the pad or panel. In the case of pads or panels formed primarily of wood or MDF board, the folded-over excess corner material, often referred to as a corner bunch or pigtail, is typically stapled to the back side of the MDF board. In the case of panels having a supportive metal frame, the corner of the metal frame is typically provided with a clearance slot, and this slot is utilized for securing the excess corner material, such as by the installer manually forcing some of the excess corner material into the slot by use of a thin blade or the like. Needless to say, these manufacturing and assembling techniques, particularly for securing the excess corner material which is folded around the corners of the pad or panel, are not only manually labor-intensive and hence time-consuming and costly, but they also result in a fairly high degree of irregularity with respect to the appearance and quality of the finished corners.

In an effort to improve on the manually intensive labor associated with covering pads or panels with flexible covering sheets, particularly in the office furniture industry as discussed above, the Assignee hereof has developed an apparatus which employs side rollers for effecting folding and pressing of the adhesive-coated edge flaps of the covering sheet around the lengthwise-extending edges of the pad or panel. Such apparatus is disclosed in co-pending U.S. Ser. No. 11/369,171, the disclosure of which is incorporated herein by reference. While the apparatus disclosed in this aforementioned application has been successfully adopted for folding and securing the adhesive-coated edge flaps of the covering sheet to the back sides and/or edges of panels and pads, this apparatus nevertheless still results in excess fabric or covering material being bunched at the corners of the pad or panel, which excess material (herein referred to as the corner flap) protrudes rearwardly adjacent the corner of the pad or panel, and must then be manually stretched, folded and secured using conventional manual securement techniques of the types described above.

Accordingly, it is an object of this invention to provide an apparatus which facilitates and at least partially automates the covering or upholstering of a pad or panel with a flexible covering material by enabling the excess material at the panel corner, namely the protruding tail of material, to be gathered, folded and secured to the back side of the pad or panel in an automated and uniform manner so as to eliminate the need to manually effect such steps.

This invention also relates to a process for operating an apparatus which is capable of effecting gathering, folding and securing of the excess corner material to the back side of a pad or panel.

In the apparatus of the present invention, there is provided a table-like support or base adapted to support at least one corner part of a pad or panel thereon. The pad or panel is already partially through the flexible covering sheet assembly process in that the covering sheet has already been stretched across the face of the panel, and the adhesive edge flaps have already been wrapped around the panel edges and adhesively secured to the back side and/or edges of the panel, thereby leaving bunches of excess fabric (i.e. tails or corner flaps) which protrude rearwardly at the corners of the panel. The table-like base is adapted to have the covered panel, with the covering sheet facing downwardly, disposed thereon, and the base has a positioning structure which cooperates with one corner of the panel to ensure that the panel is properly positioned and aligned with a corner tucking apparatus disposed adjacent the corner positioning structure. The corner tucking apparatus includes a gathering plate positioned adjacent and overlying the positioning structure, and which is slidably movable inwardly across the back side of the panel, approximately diagonally inwardly from the corner, to effect gathering and folding of the corner flap. The gathering plate has a generally V-shaped gathering notch which causes the excess corner material to be gathered together as the plate moves inwardly over the panel, with the gathered material upon reaching the apex of the notch being folded downwardly into contact with the back side of the panel as the gathering plate continues its inward movement. After folding down of the corner flap, a securing structure which is carried inwardly with the gathering plate is activated to fixedly secure the folded flap to the pad or panel. In the case of a pad or panel formed by MDF board or equivalent, the securing device includes a fastening tool which effects securement of the folded flap to the panel by means of a fastener such as a staple. In the case of a panel having a rear frame provided with a securing notch, the securing device includes a blade member which is moved downwardly into contact with the flap to effect insertion of at least part of the flap into the slot to effect securement therebetween. Following securement of the bunched flap to the pad or panel, the corner tucking device is retracted back to its initial position, which retraction typically involves lifting of the gathering plate away from the pad or panel, such as by vertical tilting of the plate, and retraction of the plate back to its original position, whereupon it is then lowered so as to be in position to carry out a further corner tucking operation.

Other objects and purposes of the invention will be apparent to persons familiar with constructions of this general type upon reading the following specification and inspecting the accompanying drawings.

Figure 1:
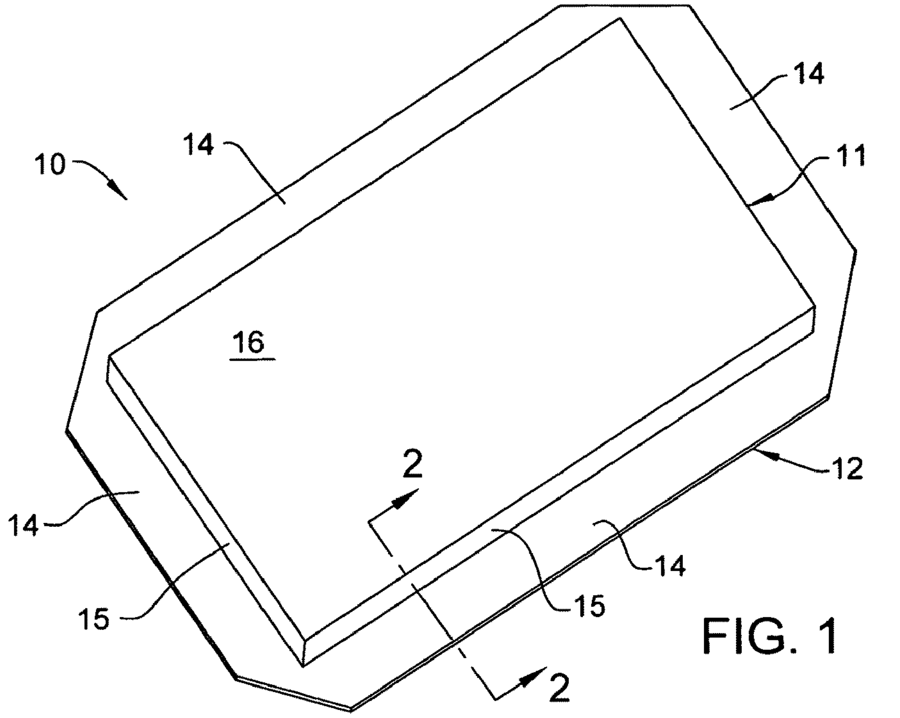
FIG. 1 is a perspective rear view illustrating a workpiece used for forming an upholstered article such as a pad or panel, which workpiece is defined by a substrate having a thin flexible cover sheet stretched across one large side (i.e. front) surface of the substrate, which cover sheet is oversized so that edge flaps of the cover sheet protrude outwardly beyond all four side edges of the substrate.

Certain terminology will be used in the following description for convenience and reference only, and will not be limiting. For example, words like "upwardly", "downwardly", "rightwardly", and "leftwardly" will refer to directions in the drawings to which reference is made. The words "inwardly" and "outwardly" will refer to directions towards and away from, respectively, the geometric center of the apparatus and designated parts thereof. Said terminology will include the words specifically mentioned, derivative thereof, and words of similar import.

DETAILED DESCRIPTION

In the following description, typical constructions of conventional workpieces are initially briefly described for background purposes. It will be understood, however, that other variations of such workpiece constructions can be adopted while still permitting edge wrapping, and more specifically corner wrapping, in accordance with the teachings of the present invention. Initially, a brief description of the edge wrapping arrangement is presented, which description is described with respect to an automated process described in greater detail in co-pending application Ser. No. 11/369,171, the disclosure of which is incorporated herein by reference. This edge wrapping description in turn is followed by a detailed description of corner wrapping techniques in accordance with the present invention.

Brief Description of Workpieces

Referring to FIGS. 1-4, there is illustrated one embodiment of a known article or workpiece 10 which is used for forming an upholstered article such as a pad or panel 17, and which can be utilized for corner wrapping in accordance with the present invention.

Figure 2:
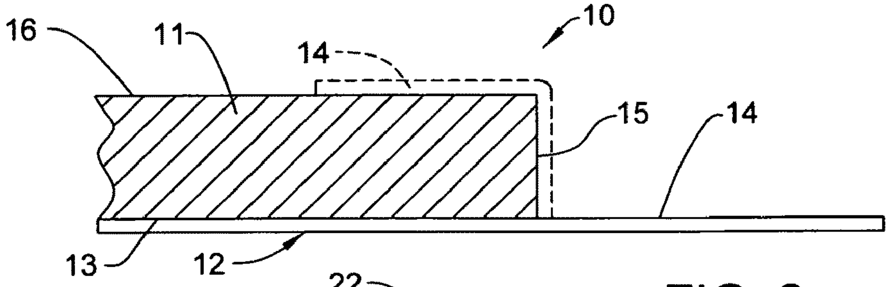
FIG. 2 is an enlarged, fragmentary cross-sectional view taken generally along line 2-2 in FIG. 1, and illustrating in dotted lines an edge flap of the cover sheet folded over and secured to the edge and back of the substrate.
Figure 3:
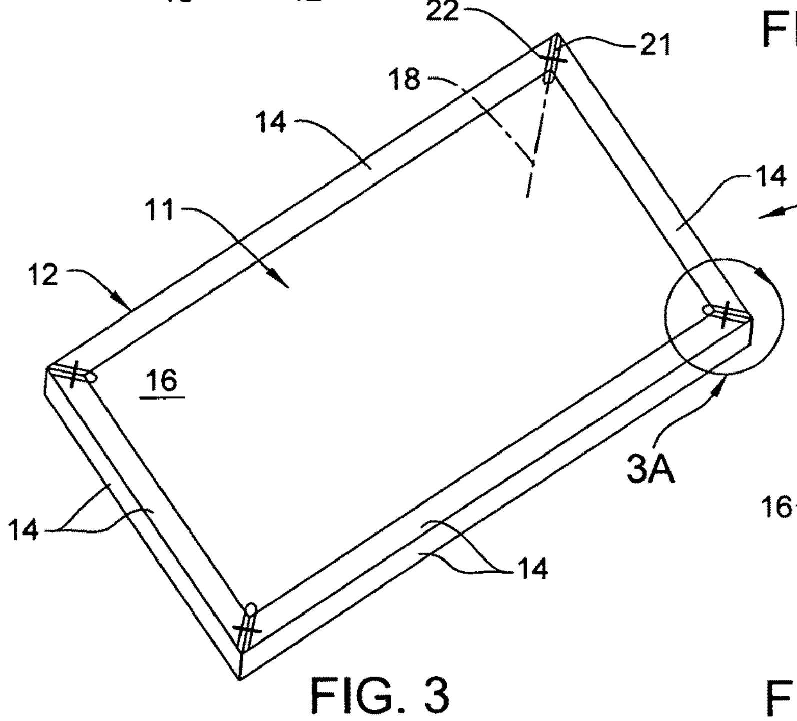
FIG. 3 is a perspective view corresponding generally to FIG. 1 but illustrating all of the cover sheet edge flaps folded over and adhered to the edges and back of the substrate, and also illustrating most of the corner tails or flaps folded over and secured.

The workpiece 10 illustrated by FIG. 1 includes a generally stiff or fairly rigid substrate 11 which has a sheet-like or plate-like configuration defined by rather large front and back sides, with the substrate 11 having a thickness which is small in comparison to its other (i.e. length and width) dimensions. The substrate 11 has a thin flexible cover sheet 12 which totally overlaps and covers one side of the substrate 11, typically the large front face. The size of the flexible cover sheet 12, which in many instances comprises a cloth or fabric or textile sheet, is greater than the size of the front face of the substrate 11 so that the cover sheet has edge portions or flaps 14 which protrude outwardly beyond all of the side edges or faces 15 of the substrate. As is typical, the corners of the cover sheet 12 are typically partially removed, one example being a diagonal cut removal as illustrated by FIG. 1, to reduce the amount of material at the corner which must be gathered and wrapped. The flaps 14 of the cover sheet, as illustrated in FIG. 2, are intended to be wrapped around the edge faces of the substrate 11 so as to not only cover and be adhesively secured to the edge face 15, but also wrapped partially around the back side 16 so as to be adhesively engaged therewith. This latter condition is illustrated by FIG. 3 which shows the flaps 14 wrapped around and adhesively secured to the back surface 16, with FIG. 3 also showing some of the corners being appropriately wrapped and tucked adjacent to the back side 16 and secured in position, frequently by means of staples or other suitable fastener structures. FIG. 3, in the corner detail designated 3A, does illustrate one corner of the workpiece wherein the flaps which wrap around the edge faces of the substrate are not yet secured but instead define a fabric bunch 19 which protrudes upwardly at the corner and which in fact protrudes upwardly a substantial extent above the back surface 16 of the substrate. This fabric bunch 19, herein referred to as a corner flap, must subsequently be gathered together and folded downwardly over the back surface (i.e. tucked), and then fixedly secured to the back surface, such as by a staple or other suitable fastening structure. The present invention relates to a process and apparatus for effecting desired tucking and securing of the fabric flap which is created at the corner of the substrate so as to result in the workpiece being fully upholstered while at the same time providing upholstered corners which have an aesthetically pleasing appearance by minimizing bunching or wrinkling of covering material at the visible corner.

Figure 4:
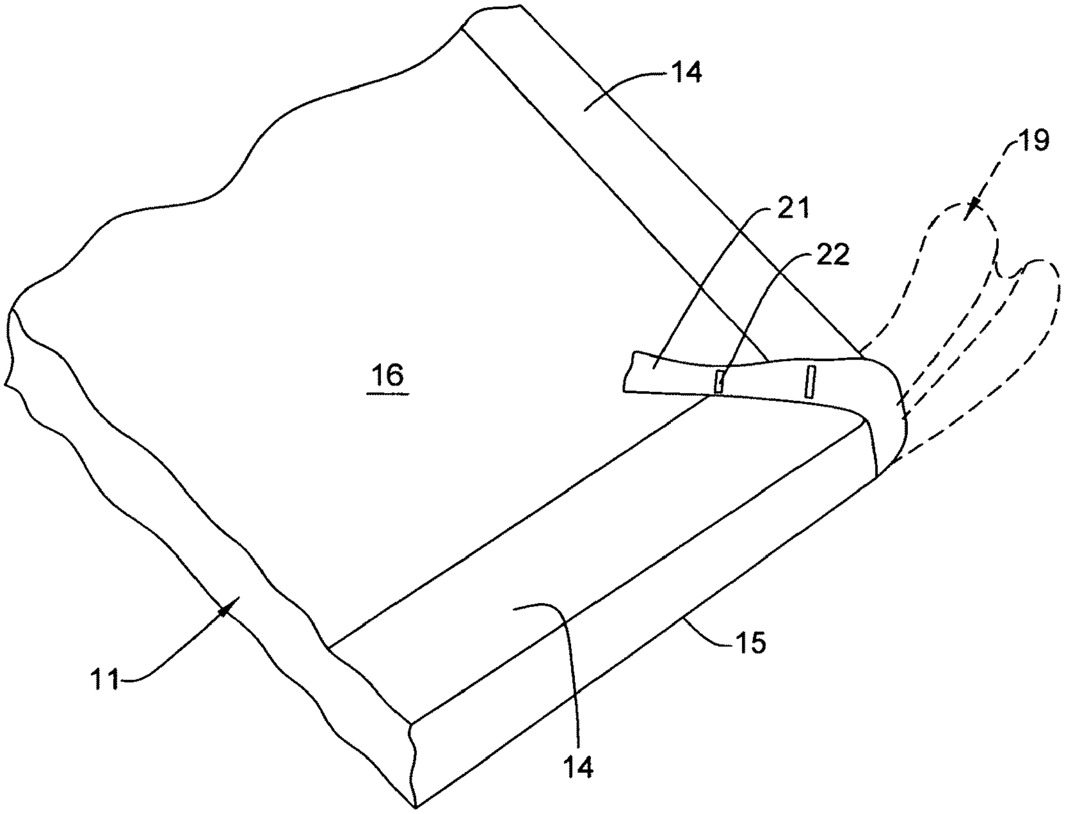
FIG. 4 is a fragmentary perspective view, on an enlarged scale, showing one corner of the substrate with the corner flap or tail folded over and secured using fasteners, and also illustrating in dotted lines the corner flap prior to its being folded over and secured.

As illustrated in greater detail in FIG. 4, the corner flap 19, which forms at the corner following the prior edge-wrapping steps, is gathered together to form a more consolidated bunch which is often referred to as a tail, which tail is folded over to overlie the back side, as illustrated by the tail 21 in FIG. 4, and the tail can then be secured to the substrate by a fastener, such as a pair of staples 22 as illustrated in FIG. 4.

When the upholstered pad 17 has been fully completed so that all of the edges and corners are wrapped, generally as illustrated by FIG. 3, then the upholstered pad 17 can be used in a conventional manner, such as a tack board or as a wall pad for attachment to a wall panel frame, particularly for use in office environments. Appropriate fasteners, in a conventional manner, can be attached to the back side of the pad to permit appropriate mounting thereof.

Figure 6:
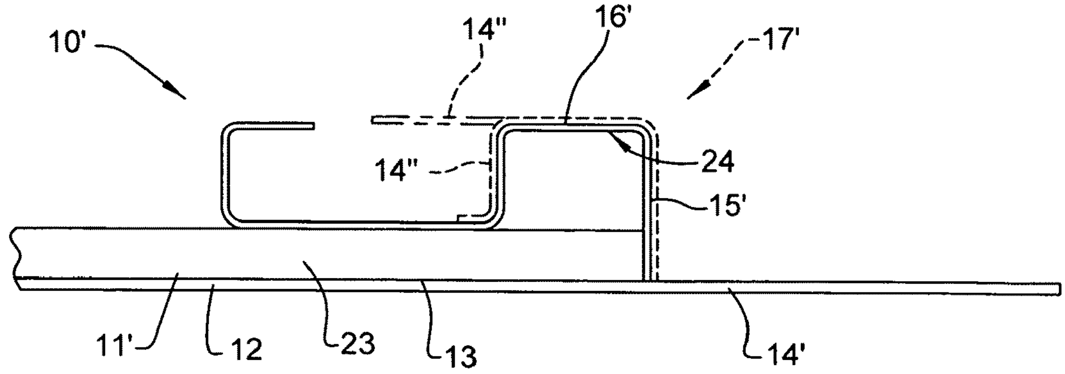
FIG. 6 is an enlarged fragmentary cross-sectional view taken generally along line 6-6 in FIG. 5, and additionally showing in dotted lines the cover sheet edge flap folded upwardly and over for adhesive securement to the side face and back of the frame.
Figure 5:
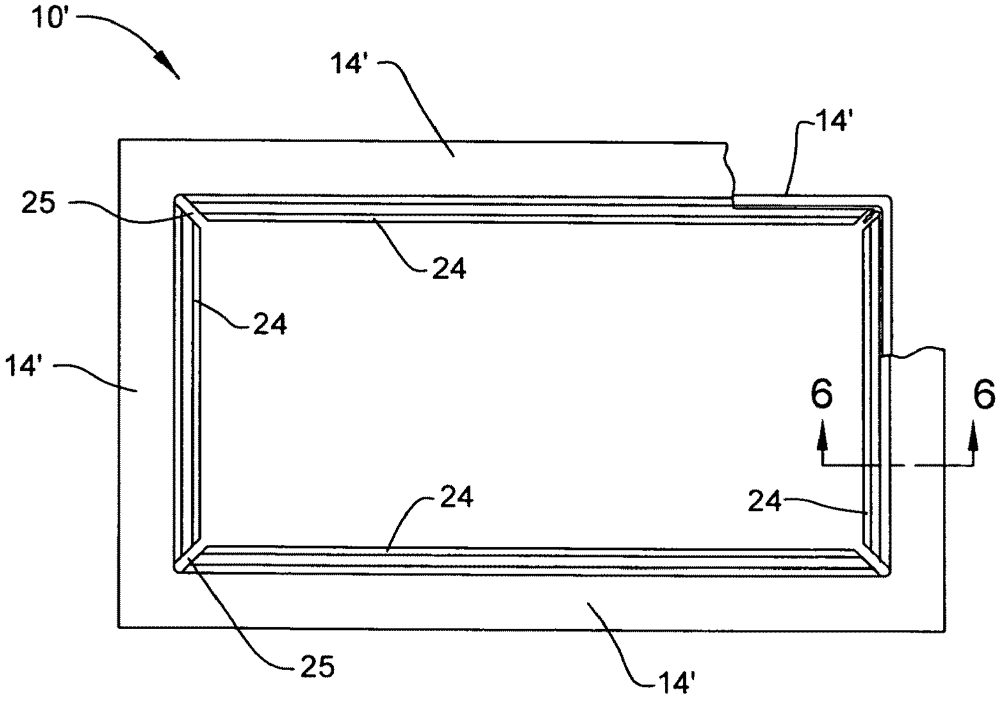
FIG. 5 is a plan view showing the back side of a modified workpiece wherein the flexible cover sheet is larger than and protrudes outwardly beyond the edges of the substrate, with the substrate including a rigid rectangular frame secured to the back thereof and positioned adjacent the peripheral edges thereof.

Referring now to FIGS. 5 and 6, there is illustrated another known configuration of a workpiece 10' which is used for creating an upholstered pad or panel. In this variation the substrate 11' is defined by a facing pad 23, such as a thin pad which may be formed of a compressed fiberglass mat or other material, and which may have a thin backing sheet (not shown) provided thereon. The substrate 11' also includes a ring-shaped frame defined by a plurality of elongate rails or brackets 24 fixed to the rear of the pad 23 and positioned adjacent and extending lengthwise along each of the perimeter edges thereof. The frame rails 24 are typically constructed of metal or other relatively rigid material, and have a cross sectional configuration which enables them to accommodate clips or fasteners so that the resulting finished pad 17' can be attached to a wall panel frame. In this construction, the edge flaps 14' of the cover sheet again wrap upwardly and adhesively secure not only to the outer side face 15', but also wrap around and secure to a back surface 16' as defined on the respective edge rail 24. Depending on the size of the flap 14', there may exist a flap portion 14" which extends beyond the rail surface 16', and this flap portion can be deflected downwardly so as to adhesively engage an inner surface of the edge rail as illustrated by FIG. 5.

Figure 3A:
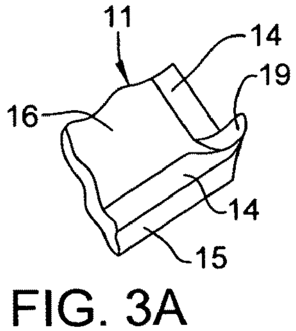
FIG. 3A is an enlarged view of the circled area designated 3A in FIG. 3 and illustrating excess material (i.e. a corner flap) at the corner of the substrate prior to this corner flap being gathered, folded and secured.

When upholstering or covering the workpiece 10' as briefly described above relative to FIGS. 5 and 6, it will be recognized that when the edge flaps of the covering sheet are wrapped upwardly and around the edges of the workpiece as illustrated by FIG. 6, the corners of the workpiece will have covering flaps formed thereat similar to the corner flaps 19 illustrated in FIGS. 3A and 4. With a workpiece of this type, the covering flap at the corner is typically gathered together so as to create a more compact bunch (i.e. a tail) which protrudes along the corner outwardly beyond the back surface of the pad. This tail or gathered bunch is then folded (i.e. tucked) downwardly over the back side of the pad, and the folded bunch is secured by manually inserting part of the bunch into a narrow slot 25 which exists between the opposed ends of adjacent frame rails 24. This tucking and securing of the corner bunch is conventionally carried out substantially entirely manually, and the insertion of the bunch into the slot 25 is normally manually accomplished utilizing a bladed tool, similar to a screw driver, to facilitate forced entry of some of the bunched material into the slot to effectively create a gripping engagement between the corner bunch and the rear edge rails. The present invention, as explained hereinafter, relates to a process and apparatus which permits the corner bunch created when covering a workpiece of the type illustrated in FIGS. 5-6 to be effectively and efficiently gathered, folded and then inserted into the corner frame slot to effect securement of the tail to the frame by eliminating the previously required manual manipulations.

Corner Wrapping—FIGS. 7-20 Embodiment

Figure 7:
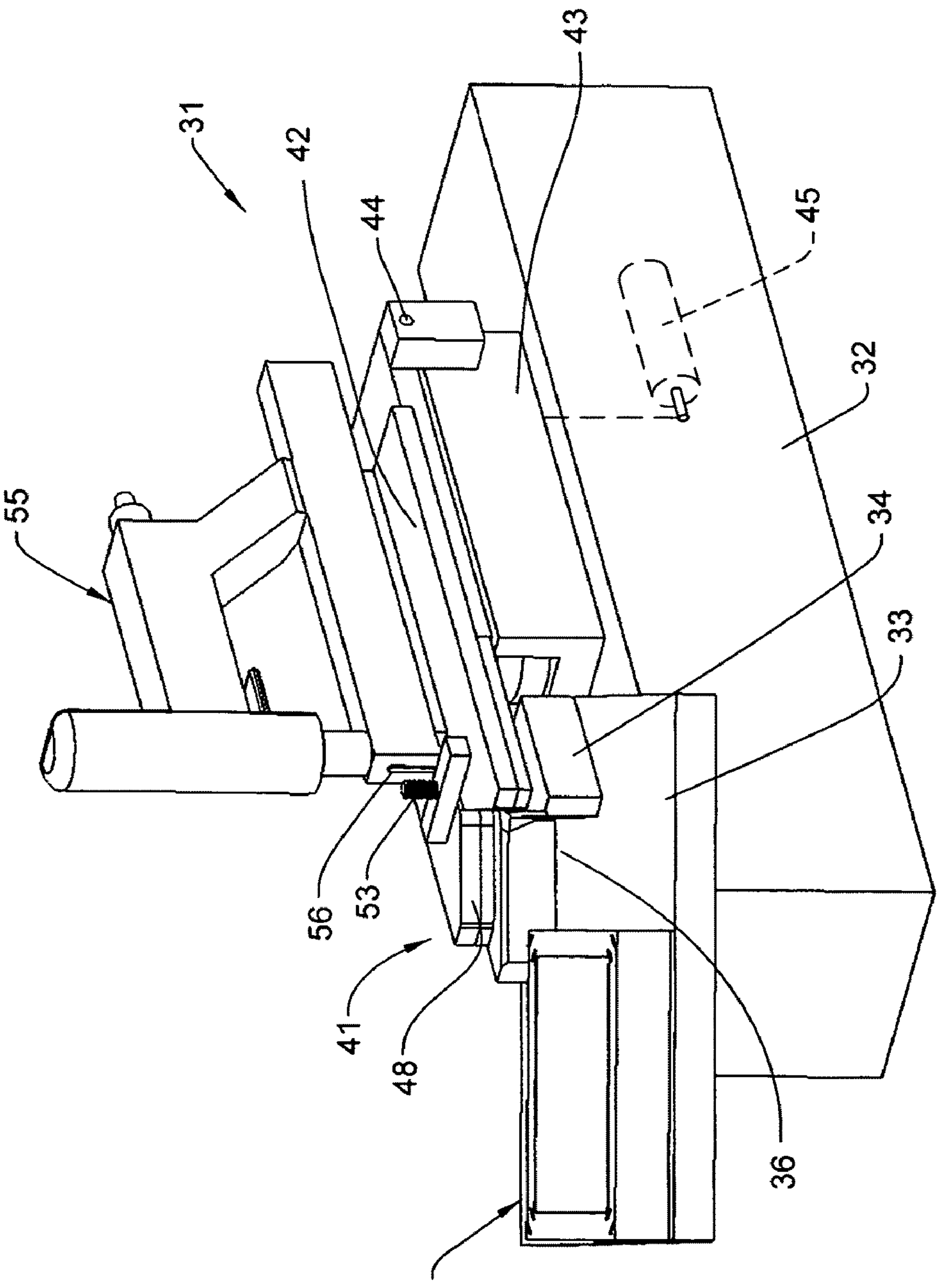
FIG. 7 is a perspective view of an arrangement for gathering, folding and securing a corner flap of a covering sheet when covering a workpiece of the type illustrated by FIG. 1, which arrangement includes a support for supporting the workpiece, and a device for gathering, folding and securing the corner flap to the substrate, which securement in this embodiment utilizes a fastener such as a staple.
Figure 8:
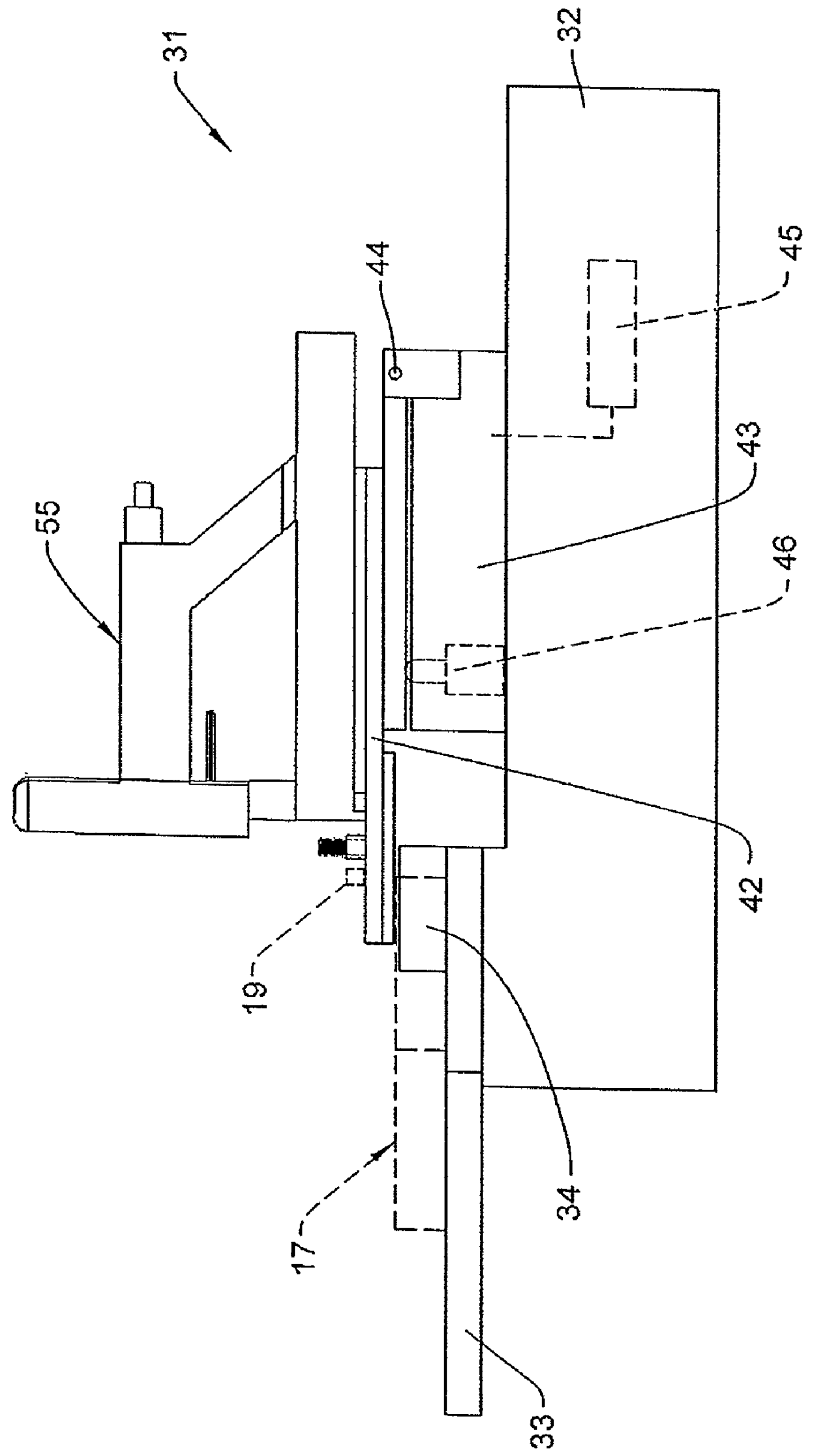
FIG. 8 is a side elevational view of the arrangement illustrated by FIG. 7, the device being in a retracted position.
Figure 9:
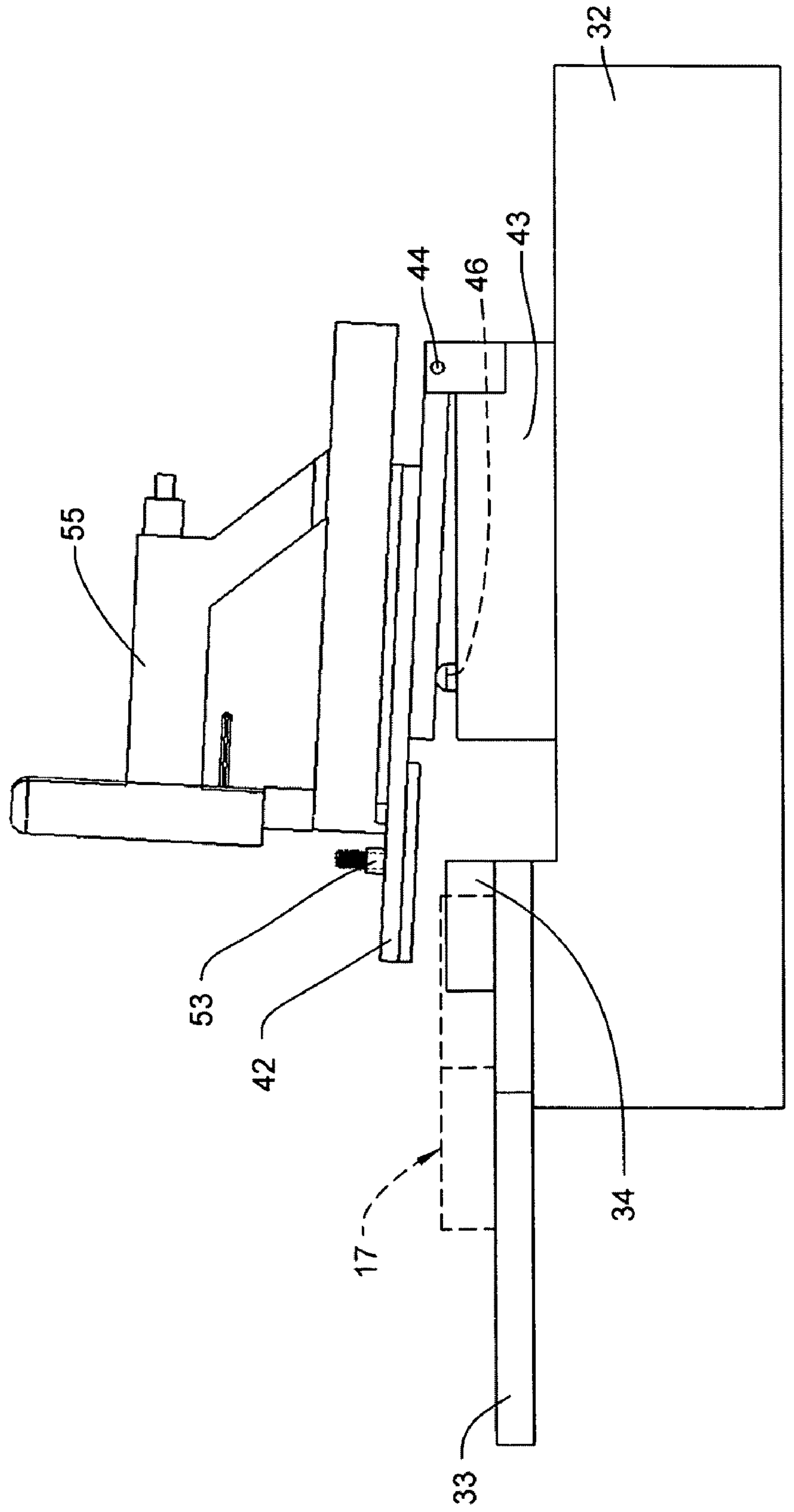
FIG. 9 is a side view similar to FIG. 8 but illustrating the retracted device in a raised or elevated position.
Figure 10:
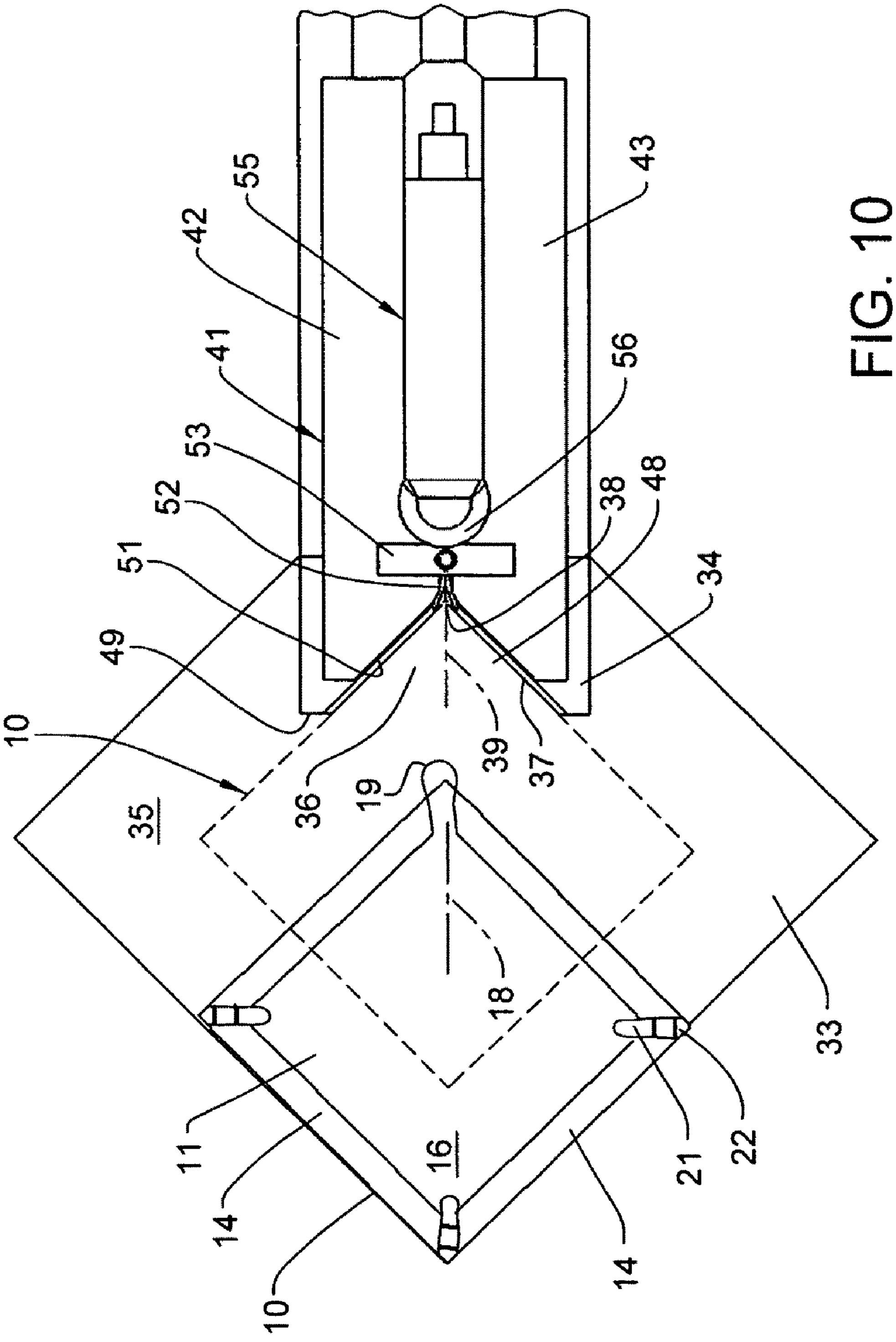
FIG. 10 is an enlarged, fragmentary top view of the arrangement illustrated in FIG. 8.

FIG. 7 and related FIGS. 8-10 illustrate an apparatus 31 in accordance with the present invention, which apparatus cooperates with a partially-covered workpiece 10 of the type illustrated in FIGS. 1-4 to effect tucking and securing of the corner flaps 19. More specifically, the workpiece 10 is already in a partially covered state in that the flexible cover sheet 12 is already stretched across the front face 13 and the edge flaps 14 of the cover sheet have been wrapped around and adhesively secured to the side and rear edges similar to that illustrated in FIGS. 2 and 3. However, this results in creation of bunches of fabric 19 at each of the corners (hereinafter referred to as corner flaps) similar to the bunch 19 illustrated in FIGS. 3A and 4. The apparatus 31 of this invention cooperates with the workpiece 10 and specifically the corner flaps 19 to effect gathering of the corner flap 19 into a more compact bundle or bunch if necessary, and also effects slight stretching or tensioning of the fabric bundle while folding the bundle into contact with the back side of the workpiece generally along a line 18 which projects inwardly and bisects the angle of the corner. Once the bundle 19 has been folded and pressed into contact with the back side of the workpiece, then the bundle is fixedly secured to the workpiece by means of a fastener 22, such as a staple, to create the condition illustrated by solid lines in FIG. 4.

In the following description which relates to the structure and operation of this invention, the term "tucking" is used in conjunction with a process which typically includes several functions including gathering of the corner flap material in a more compact bundle, folding and pressing of the bundle against the back side of the workpiece, the folding also typically being accompanied by at least some tensioning and/or straightening of the material as it is moved into contact with the workpiece so as to minimize wrinkling or bunching of the material which spans over the exposed faces of the corner.

Considering now the specifics of the tucking and securing apparatus 31 illustrated by FIGS. 7-10, this apparatus includes a generally stationary base or housing 32 providing thereon a support or table 33 having a generally large and planar upper surface 35 for supporting thereon a workpiece such as a workpiece 10, on which tucking and securing of corner flaps is desired. FIG. 7 illustrates thereon the workpiece disposed in supportive engagement on the support table, the corner flaps having already been tucked and secured, with the workpiece being disposed in spaced relationship from the active components of the apparatus.

The support table 33 mounts thereon a workpiece positioning structure 34 disposed on and projecting upwardly from the support surface 35, and defining therein a workpiece receiving notch 36 which is generally V-shaped in plan view and which opens outwardly along the upper surface of the support table. The notch 36 is defined generally between side walls 37 which angle inwardly toward one another and terminate generally at the apex 38 of the notch. The included angle defined by the notch 36 corresponds to the angle defined at the corner of the workpiece, which angle is typically 90°. The line 39 (FIG. 10) represents the bisector line for the notch 36, and also corresponds to and represents the bisector line 18 for the corner angle of the workpiece.

The housing 32 mounts thereon a tucking device 41 which includes, as a principal component, a gathering member 42 which, at the front end thereof, is formed generally as a plate positioned so as to be disposed above and slidably moved over the workpiece positioning structure 34. The gathering member 42 is carried on a carriage or slide 43, being connected thereto by a generally horizontally-projecting transverse pivot 44 which enables the gathering member 42 to be vertically swingable displaced relative to the carriage 43. The carriage or slide 43 in turn is horizontally slidably supported on the housing 32 for reciprocating back-and-forth movement, and for this purpose is connected to a drive unit 45, such as a fluid pressure cylinder, which couples between the base 32 and the carriage 43. A further drive unit 46, such as a fluid pressure cylinder, cooperates between the carriage 43 and the gathering member 42 to control and more specifically cause upward tilting of the gathering member 42, such as into a raised position as diagrammatically illustrated in FIG. 9. The gathering member 42 is, however, normally maintained in a lowered position, substantially as illustrated in FIG. 8, wherein it is supportingly engaged on the top of the workpiece positioning structure 34, with the gathering member being normally biased into this lowermost position not only due to its own weight, but also preferably by means of springs, such as torsion springs (not shown) which may cooperate about the pivot 44 for causing a downward (i.e. counterclockwise) urging of the gathering member 42 about the pivot 44.

The gathering member 42, at a front end 49 thereof, is provided with a gathering recess 48 formed generally as a V-shaped notch which opens inwardly from the front end of the gathering plate and has its orientation aligned with that of the V-shaped positioning notch 36 defined in the workpiece positioning structure 34. The V-shaped gathering notch 48 is normally defined by an included angle which is substantially the same or slightly less than the included angle defined by the notch 36, with this angle typically being about 90°.

The V-shaped gathering notch 48, as illustrated in FIG. 10, is defined by side walls 51 which, at the apex of the notch, terminate at a narrow slot 52 which projects inwardly from the apex generally along the bisecting line 39. This slot 52 projects inwardly (i.e. rearwardly) away from the apex through a limited distance and, at a small distance spaced rearwardly from the apex, there is provided a pressing unit 53 which extends across the slot 52 and, as explained in greater detail hereinafter, extends across the slot in slightly upwardly spaced relationship above the bottom of the gathering member 42 so as to effect folding over and pressing down of the gathered corner flap during the tucking operation.

The tucking and securing apparatus 31 also includes a securing device 55 which is carried on and protrudes upwardly from the gathering member 42. The securing device 55 is provided for fixedly securing the tucked corner flap to the rear side of the workpiece substrate. This securing device 55, in the illustrated embodiment, comprises a conventional stapling tool and more specifically is a conventional pneumatic stapler, the construction and operation of which is well known. This stapler is carried on the gathering member 42 and positioned so that the staple discharge head or nose 56 projects downwardly into a cross slot 57 formed in the gathering member 42 at a location close to but disposed rearwardly of the pressing unit 53. This enables the discharge nose 56 of the stapler to be accessible to the workpiece and specifically the tucked corner flap during the overall corner tucking and securing operation.

Figure 19:
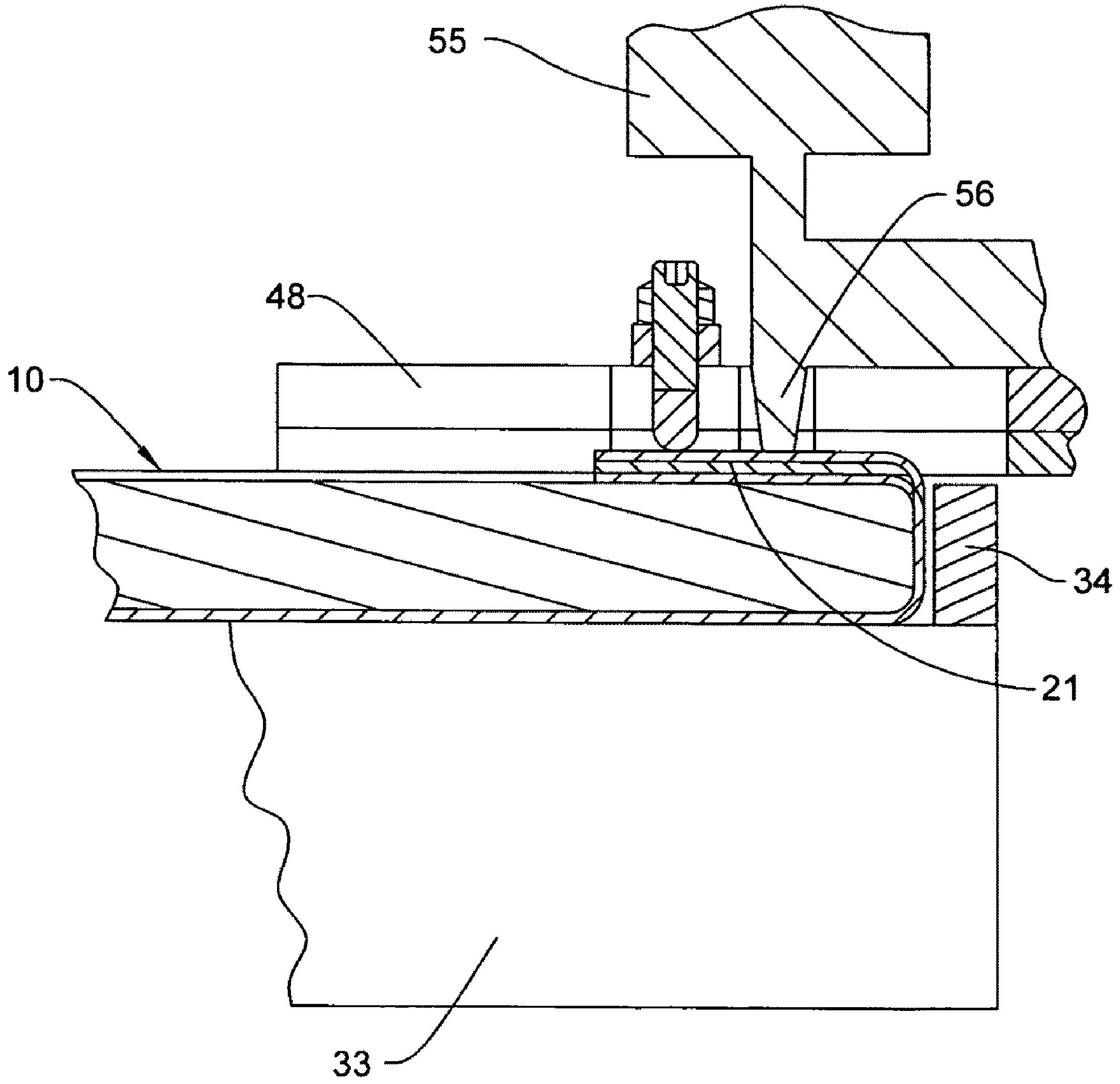
FIG. 19 is an enlarged sectional view which illustrates the manner in which the corner flap is secured to the substrate when the tool is in the position illustrated by FIGS. 13-14.
Figure 20A:
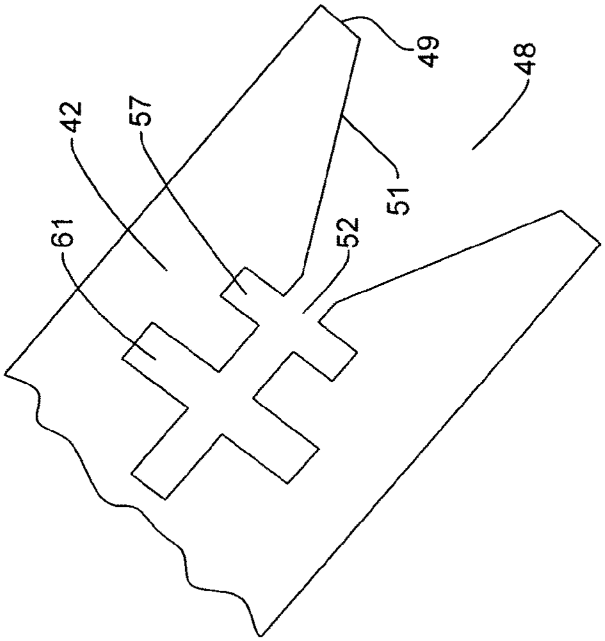
FIG. 20A is a fragmentary view showing the nose end of the gathering plate and specifically showing the configuration of the slot arrangement formed therein.
Figure 20:
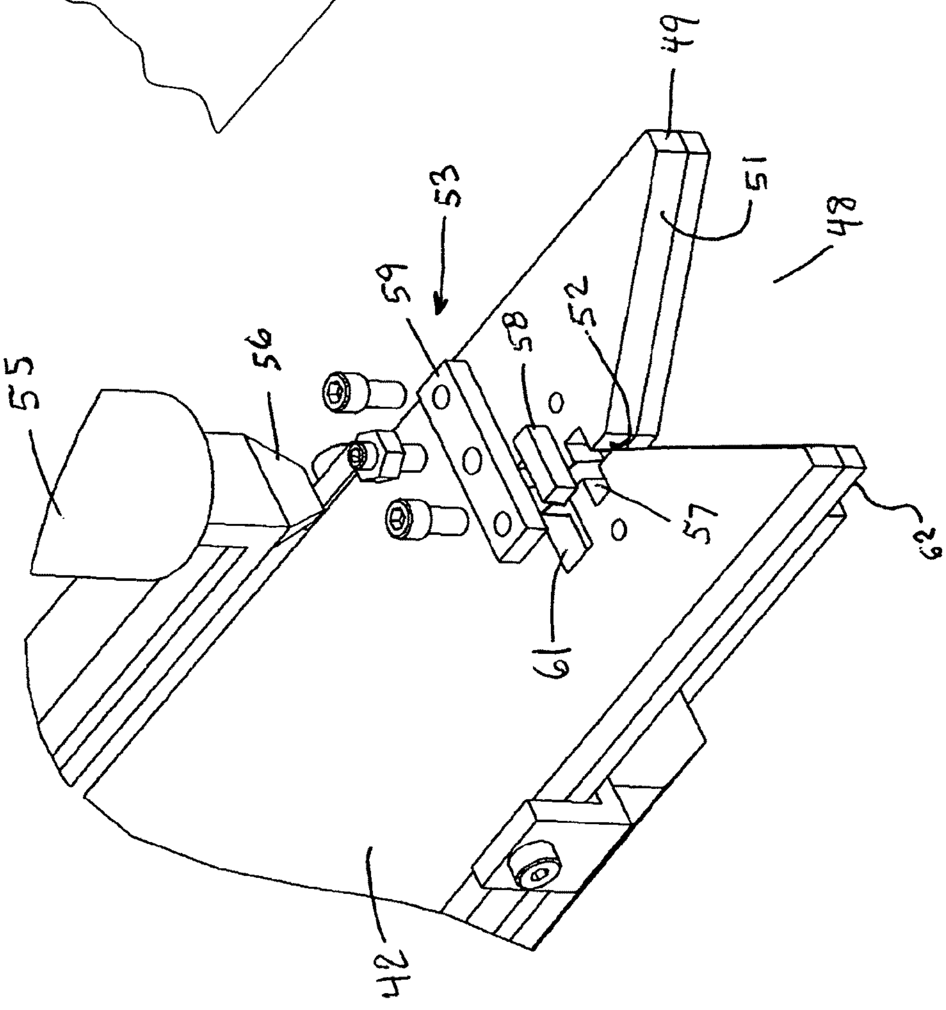
FIG. 20 is a fragmentary, exploded, perspective view of the gathering plate and its relationship to the nose of the staple gun.

Regarding the pressing unit 53 and referring specifically to FIGS. 19-20, such unit includes a pressing member 58 which is positioned within and extends along an elongate slot 57 which is formed in the gathering plate and extends transversely thereof, more specifically transversely across the slot 52 in rearwardly spaced relation from the apex of the gathering recess 48. This slot 57, adjacent the ends thereof as disposed on opposite sides of the slot 52, define shoulders which support thereon the pressing member 58 so that the latter is normally maintained at an elevation which is spaced upwardly a small distance above the bottom surface 62 of the gathering plate so as to provide clearance or space for passage of the folded corner flap therebeneath. The pressing member 58, in the embodiment illustrated by FIGS. 19-20, is held in position within the slot 57 by means of a top holding plate 59 which overlies the slot and is fixed to the top of the gathering member 42. A spring normally cooperates between the holding plate 59 and the pressing member 58 so as to resiliently urge the latter downwardly against its stops, while at the same time providing sufficient resiliency to exert a resilient downward holding pressure against the pressing member 58 so as to accommodate irregularities which exist when the bunched folded corner flap passes beneath the pressing member.

As illustrated by FIG. 20A, the apex slot 52 preferably projects rearwardly of the gathering plate a sufficient distance, such as projecting across both of the slots 57 and 61, so that the slot 52 can accommodate the tail therein when the tail is folded down, and the gathering plate is in its most advanced position.

Figure 11:
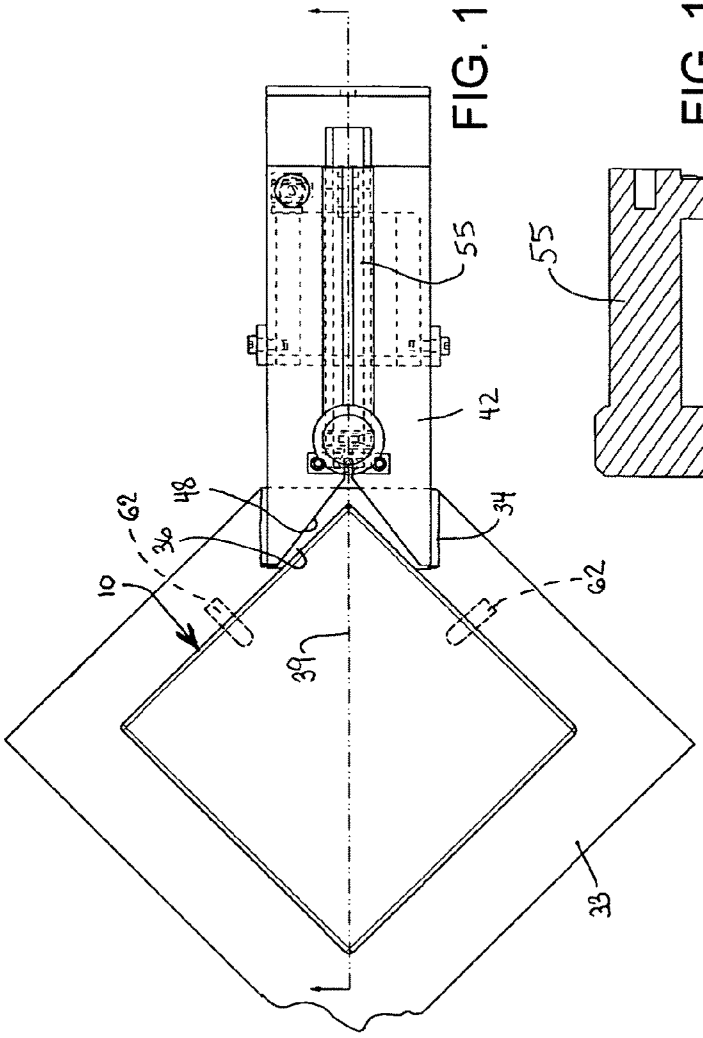
FIG. 11 is a top view similar to FIG. 10 but showing an upholstered workpiece in position for folding and securing of the corner flap.

Referring now to FIGS. 11-18, there is illustrated various plan and side views which show the tucking and securing apparatus in various positions which are assumed by the apparatus during a corner tucking operation. In addition, while the apparatus illustrated by these drawings may assume a slightly different configuration from that illustrated by FIGS. 7-10, they nevertheless structurally and functionally cooperate in the same manner, and hence are identified by the same reference numerals, so that further detailed description of the individual parts is believed unnecessary. It should be noted, however, that the V-shaped positioning notch 36 and the V-shaped gathering notch 48 illustrated in FIG. 11 are of different angular extent, with the gathering notch 48 defining a slightly smaller angle than the positioning notch 36. This is a matter of design choice, and the angle of notch 48 can be enlarged to be equal to the angle of positioning notch 36 if desired.

Operation—FIGS. 7-20 Embodiment

The corner tucking and securing operation as performed by the apparatus 31 will now be described in greater detail, particularly with reference to FIGS. 11-18, which illustrate this apparatus in its various operational positions.

Figure 12:
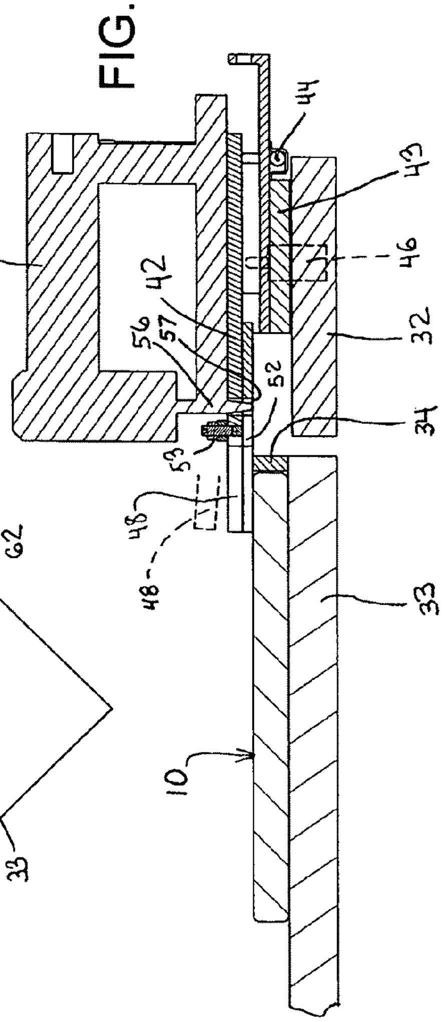
FIG. 12 is a side elevational view of the arrangement illustrated in FIG. 11 and showing the gathering plate in its retracted position.

The apparatus 31 is normally maintained in its initial position substantially as illustrated in FIGS. 11-12, in which position the gathering member 42 is disposed in its lowermost position so that the front end thereof is disposed directly over the workpiece positioning structure 34, whereby the gathering notch 48 is positioned substantially directly above and most frequently slightly rearwardly from the workpiece positioning notch 36.

A workpiece 10 having an upwardly projecting corner flap 19 (FIG. 4) is then positioned, either manually or automatically, onto the support plate 33 and is positioned so that the corner of the workpiece having the upwardly protruding flap 19 is seated within the positioning notch 36. This results in the upwardly protruding corner flap 19 projecting upwardly into the interior of the gathering notch 48. With the workpiece snugly positioned within the notch 36 of the workpiece positioning structure 34, the workpiece is stationarily secured relative to the support table by securing clamps, as diagrammatically illustrated at 62, which clamps are of conventional construction and which can be automatically or manually engaged and released when desired.

With the workpiece clamped on the table in the position illustrated by FIGS. 11-12, the corner tucking and securing operation is ready to begin. For this purpose, the pressure cylinder 45 slides the carriage 43 forwardly generally along the line 39 which bisects the workpiece corner angle as well as the notch angle, thereby causing the gathering plate 42, which is urged downwardly (counter-clockwise about the pivot 44) into contact with the upper surface of the workpiece positioning structure 34, into contact with the exposed upper surface (which is actually the back surface) of the workpiece. As further explanation in this regard, the height of the workpiece positioning structure 34 preferably equals or is only slightly less than the height of the workpiece, and the lower edges of the side walls 51 defining the gathering notch 48 are preferably tapered or champhered so that the gathering plate can successfully slide into engagement with the upper side of the workpiece and maintain a downward pressing engagement therewith as the gathering plate is slidably moved forwardly over the workpiece.

Figure 13:
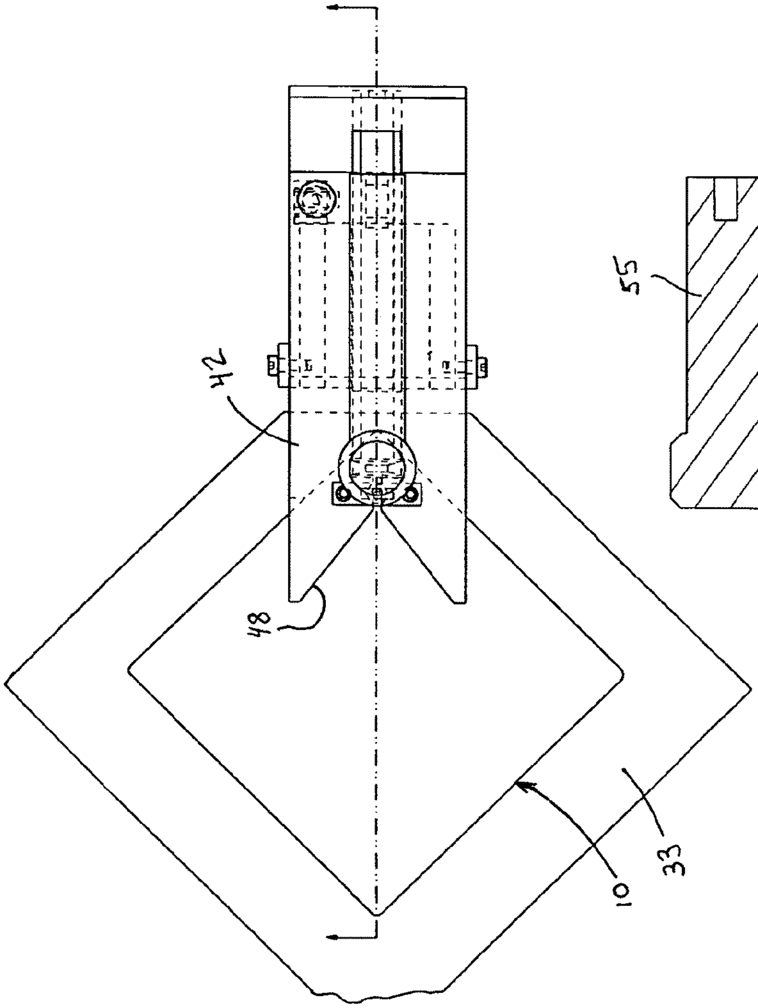
FIGS. 13 and 14 respectively correspond to FIGS. 11 and 12, but illustrate the gathering plate in a partially extended position.
Figure 14:
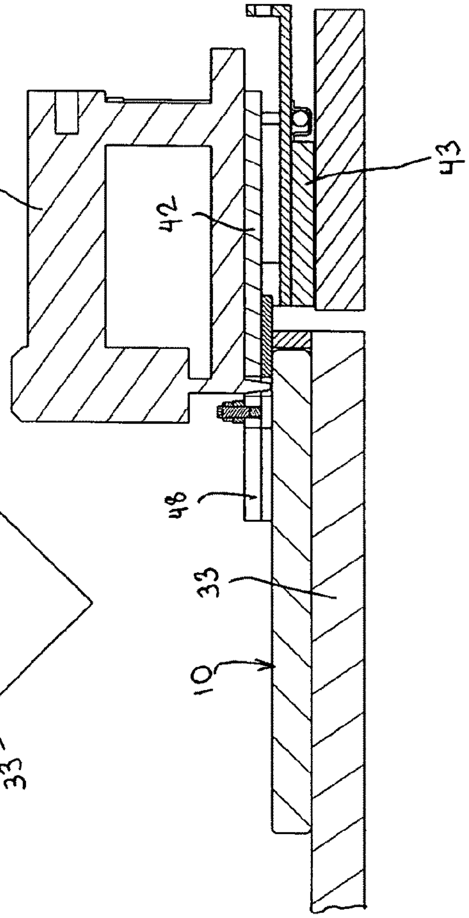

As the gathering plate is slidably moved forwardly from its initial position illustrated in FIGS. 11-12 toward the intermediate position illustrated in FIGS. 13-14, the upwardly protruding corner flap 19 is initially bunched together into a tighter or more compact bunch (referred to as a tail) as the material slides along the notch 48 toward the apex and then into the narrow slot 52 located at the apex. The continued forward sliding movement of the gathering member 42, however, causes the tail to not only move into the narrow slot 52 but also into contact with the pressing member 58 which causes the tail to be folded down and effectively pressed into contact with the upwardly-facing back surface of the workpiece as the gathering member 42 and pressing member 58 continue their forward movement. At a predetermined forward position, such as approximately halfway along the length of the folded-down tail, the drive cylinder 45 stops forward movement of the carriage 43 and gathering plate 42, and the stapling device 55 is activated, either manually or by suitable automated electronic controls, to eject a staple from the gun head 56 through the folded over corner flap (i.e. tail) into the substrate of the workpiece.

If necessary or desired, a second staple can be used to secure the tail to the workpiece, and in this illustrated embodiment such is the case, as explained hereinafter.

Figure 15:
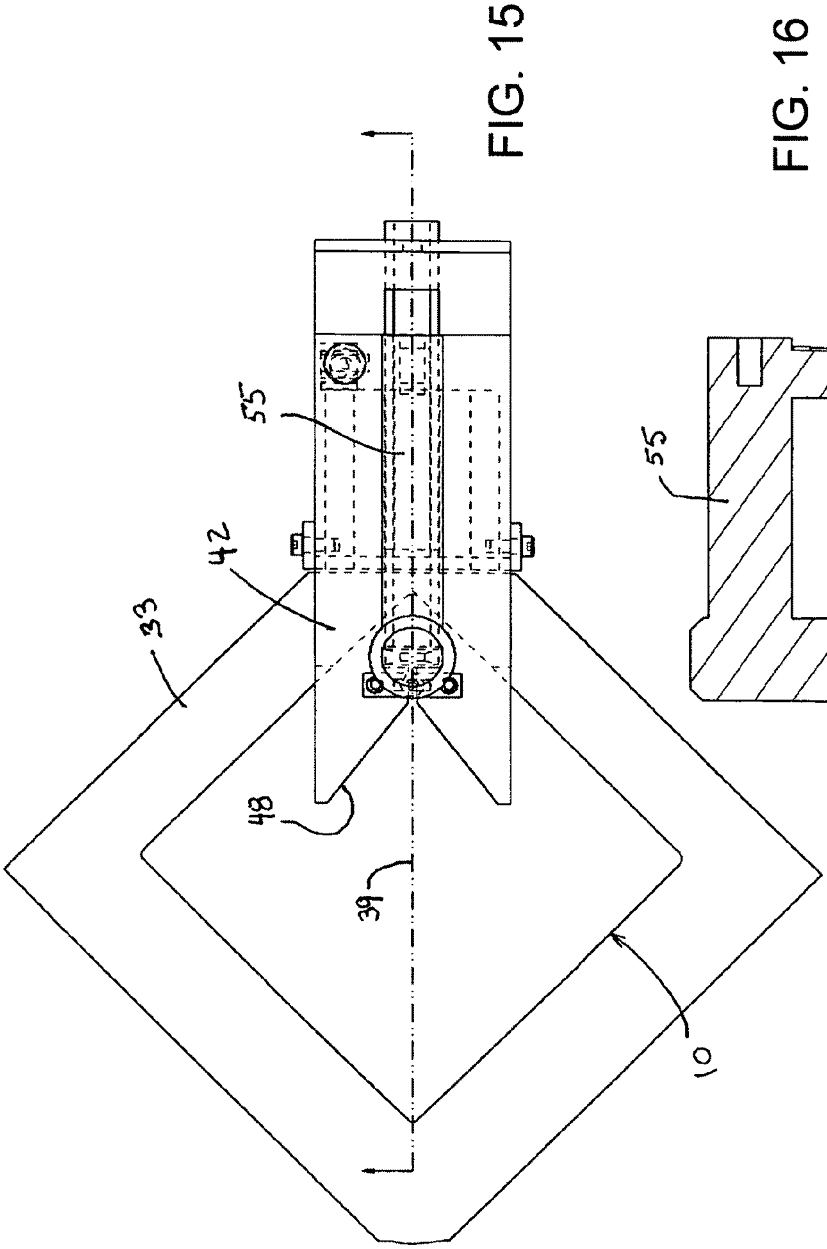
FIGS. 15 and 16 respectively correspond to FIGS. 13 and 14 but illustrate the gathering plate in a fully extended position.
Figure 16:
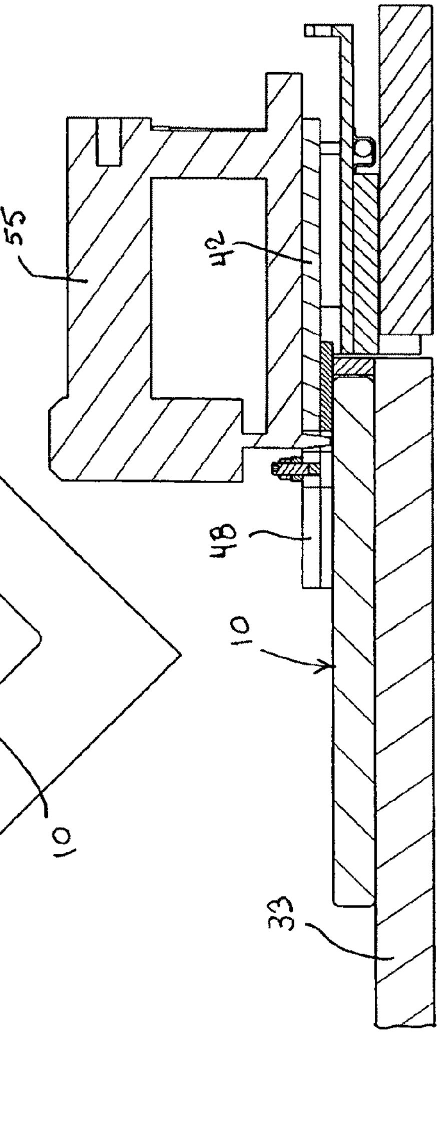
Figure 17:
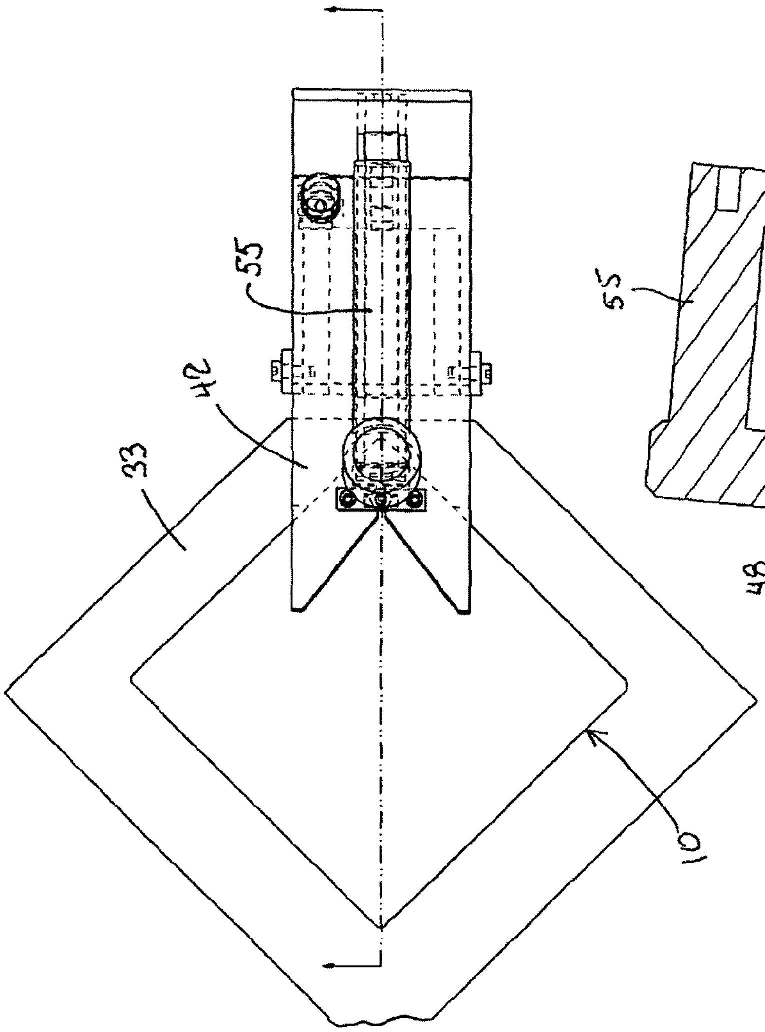
FIGS. 17 and 18 respectively correspond to FIGS. 13 and 14 but illustrate the gathering plate in a raised position, prior to retraction thereof, but following securement of the corner flap to the substrate.
Figure 18:
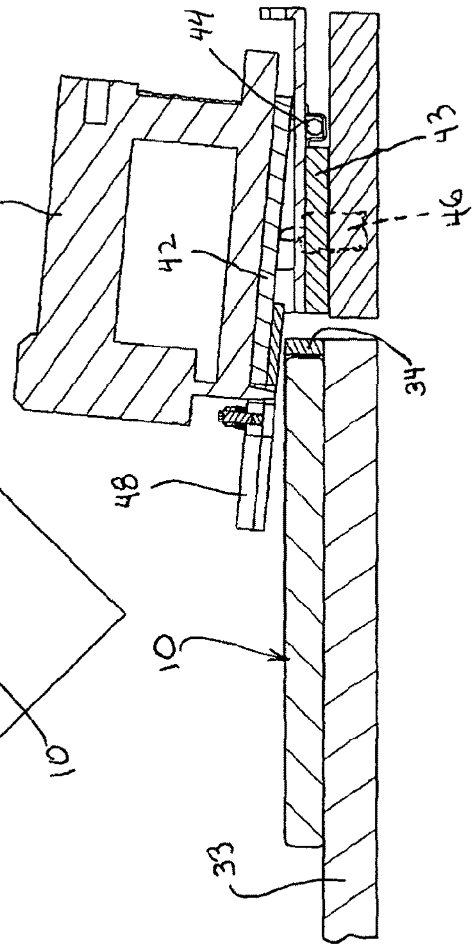

Specifically, after ejection of the first staple, then the drive cylinder 45 is again activated to drive the carriage 43 and gathering plate 42 forwardly through a further extent, namely to a position wherein the pressing member 58 is disposed in downward pressing engagement with the folded tail closely adjacent the free end thereof. The drive device 45 is then stopped, and the staple gun 55 is again activated to eject a second staple downwardly through the folded tail, with the second staple being positioned in spaced relationship from the first staple so that the folded tail is secured to the substrate of the workpiece at two locations spaced along the tail length. This positioning for ejection of the second staple is illustrated in FIGS. 15 and 16, at which time the fixed securement of the tail to the substrate has been completed.

Thereafter, the lifting cylinder 46 is energized to pivot the gathering plate 42 and the stapling unit 55 carried thereon upwardly about the pivot 44 (FIGS. 17-18), whereupon the driving cylinder 45 is reversely energized to retract the carriage 43 (and the gathering plate 42 carried thereon) rearwardly back to its initial retracted position, whereupon the lifting cylinder 46 is de-energized and the overall apparatus is hence back in its original position as illustrated by FIGS. 11-12, thereby being positioned so as to permit a subsequent corner tucking operation to be carried out, either on the same workpiece or on a newly presented workpiece.

Corner Wrapping—FIGS. 21-28 Embodiment

FIGS. 21-28 illustrate an alternate construction of a tucking and fastening apparatus 131 for securing the corner flap of a flexible covering material to a workpiece, which apparatus 131 is particularly suitable for securing a corner flap to a workpiece 10' of the type illustrated by FIGS. 5-6 as described above. The workpiece 10' has a fastening structure fixedly associated with the rear side thereof adjacent each corner, which fastening structure in the illustrated embodiment is defined by a narrow slot 25 which extends inwardly from the corner along the corner angle bisector, and which opens inwardly from the rear face between opposed adjacent ends of the side frame rails 24.

The tucking and securing apparatus 131 illustrated by FIGS. 21-28 includes a stationary housing or base 132 which, as a part thereof, includes a stationary support table 133 having a large and generally planar upper surface 134 which is typically horizontally oriented and is provided for supporting a workpiece thereon, such as the workpiece 10' illustrated in FIGS. 5-6. The workpiece support table 133 mounts on the upper surface thereof a workpiece positioning structure 135 which, in plan view, has a generally V-shaped notch 136 formed therein, as defined between the side walls 137 thereof. This notch typically defines therein an included angle of 90° corresponding to the angle defined by the corner of the workpiece so that the workpiece corner can be snugly fitted into the positioning notch 136 when the workpiece is supported on the support surface 134. When so positioned, the workpiece is then suitably clamped to the table by clamps which can be either manually or automatically activated, similar to the clamps as diagrammatically illustrated in FIG. 12. With the workpiece positioned within the V-shaped notch 136 and secured to the table, the notch angle as well as the corresponding corner angle of the workpiece are effectively bisected by an imaginary line 138 which extends outwardly from the apexes of the notch and workpiece corner.

Figure 21:
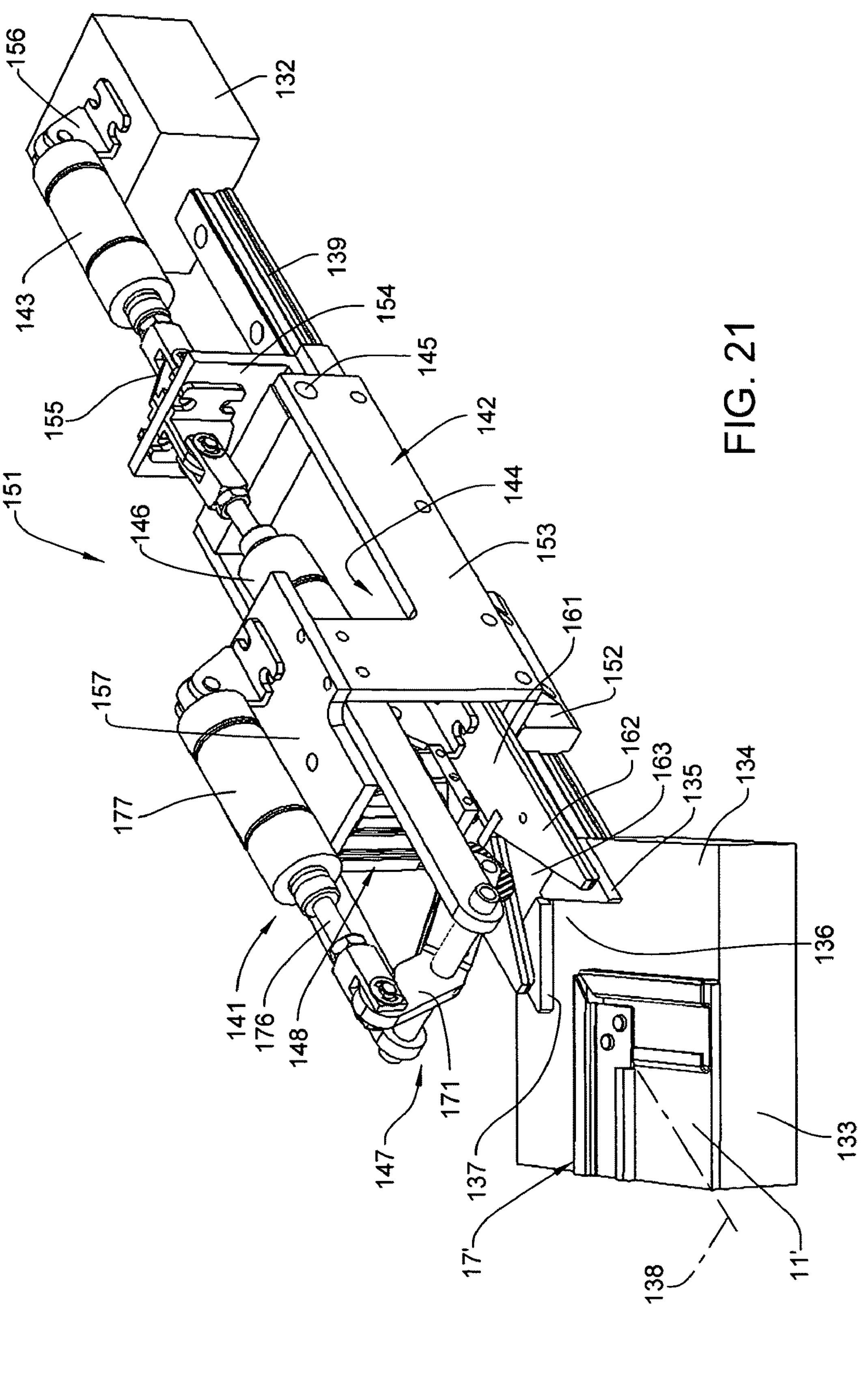
FIG. 21 is a perspective view of another embodiment of a tucking and fastening apparatus for handling a corner flap when covering a workpiece with a flexible sheet of covering material, which embodiment is particularly suitable for tucking and securing the covering material corner flaps of a workpiece having a structure corresponding to or similar to that illustrated by FIGS. 5-6.
Figure 22:
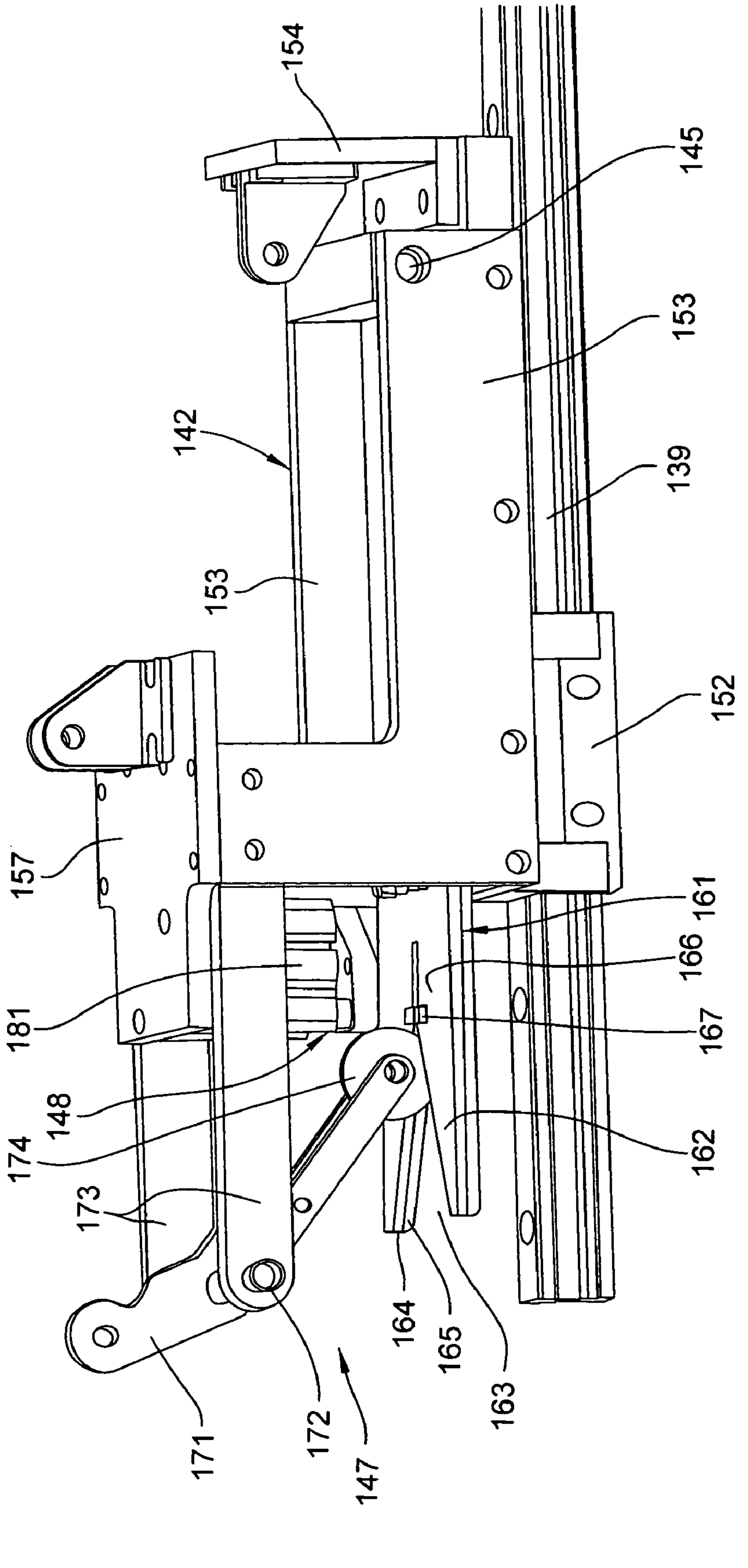
FIG. 22 is a perspective view similar to FIG. 21 but various structural parts of the tucking apparatus are removed for clarity of illustration.

The apparatus 131 includes, as illustrated in FIGS. 21-22, an elongate guide rail arrangement 139 which is fixedly related relative to the housing and is generally horizontally elongated for movably supporting thereon a tucking device 141 which is supported for horizontally reciprocal movement thereon so as to permit the tucking device to cooperate with the corner of the workpiece when it is clamped to the support table 133.

The tucking device 141 includes a carriage 142 which is movably (i.e., slidably and/or rollingly) supported on the rail arrangement 139 for horizontal back-and-forth movement. The movement of the carriage is controlled by a drive unit 143 such as a conventional fluid pressure cylinder. The carriage mounts thereon a material gathering structure 144 which, adjacent its rearward end (i.e., rightward end in FIGS. 21-22) is connected by a generally horizontal transverse pivot 145 to the rear of the carriage 142 to permit the gathering structure 144 to be vertically swingable, through at least a limited range, relative to the carriage 142. A further drive device 146, for example a conventional fluid pressure cylinder, connects between the carriage 142 and the gathering structure 144 to control vertical swinging and positioning of the gathering structure 144 about its horizontal pivot 145.

The tucking device 141, adjacent the forward or leading end thereof, movably mounts thereon a pre-tucking arrangement 147 which is provided for initially cooperating with the upstanding corner flap of covering material so as to effect straightening of the material and partial folding over thereof so as to cause at least initial insertion of some of the corner flap material into the corner slot 25 defined by the adjacent frame ends. A main tucking blade arrangement 148 is also mounted on the forward or leading end of the tucking device 141, which main tucking blade arrangement 148 is disposed adjacent but rearwardly of the pre-tucking arrangement 147 and is substantially aligned therewith (in the direction of motion of the carriage) so as to carry out a final tucking or inserting of the corner flap material into the retaining slot 25 associated with the corner of the workpiece.

Considering now the overall construction of the tucking device 141 in greater detail, and referring initially to the carriage 142, the latter includes a bottom member 151 positioned generally over the rail arrangement 139 and mounting thereon a downwardly protruding guide structure 152 which embraces and supports the carriage on the rail arrangement for back-and-forth movement therealong. The carriage 142 has a pair of generally parallel side plates 153 which are fixed to and protrude upwardly from the bottom member 151 in sidewardly spaced relationship. The side plates 153 adjacent their rearward ends are fixedly joined by a rear cross plate 154. The latter has a pivot coupling 155 joined thereto for connection to one end of the drive cylinder 143, such as the free end of the extendable piston rod, with the other end of the drive cylinder 143 being pivotally joined to a clevis 156 fixed to the stationary housing 132.

The carriage 142 in the illustrated construction also has a top plate 157 spaced upwardly from the bottom member 151 and extending sidewardly between and fixedly joined to upper edges of the upwardly protruding side plates 153.

The gathering structure 144 is defined primarily by a plate-like member 161 which is generally horizontally oriented and is horizontally elongated in the lengthwise direction of the device, which lengthwise direction extends generally parallel with the lengthwise extent of the support rail arrangement 139. The elongated horizontally-extending center line of the device and of the plate-like gathering member 161 is disposed generally parallel with and in the same upright or vertical plane as the angle bisecting line 138.

The plate-like gathering member 161 is positioned vertically between the top and bottom plates of the carriage 142, and sidewardly between the side plates thereof, with the front end part 162 of the gathering member 161 protruding forwardly beyond the front end of the carriage so as to normally vertically overlap the V-shaped workpiece positioning member 135 as fixed to the support table 133.

The front end part 162 of the plate-like gathering member has a generally V-shaped gathering notch 163 formed therein and opening rearwardly from the front end 164. This V-shaped gathering notch 163 is defined by opposed side walls 165 which converge inwardly to effectively terminate at the apex of the gathering notch, at which apex there is defined a narrow slot 166 which projects vertically through the gathering plate 161 and which opens rearwardly away from the apex through a further limited extent. The slot 166 extends generally along the lengthwise extending centerline of the gathering plate, which lengthwise centerline not only intersects the V-shaped gathering notch 163 but is also contained within the aforementioned upright central plane containing the angle bisecting line 138.

The included angle defined by the V-shaped gathering notch 163 preferably should not exceed the angle defined by the workpiece positioning notch 136, the latter typically being a 90° angle. In the preferred construction, however, the included angle defined by the gathering notch 163 may be smaller than the typical 90° angle defined by the positioning notch 136, with the gathering angle preferably being in the range of 60°, plus or minus about 10°, since this smaller angle has been determined to provide a more aggressive cooperation with the corner flap material, specifically with respect to its ability to gather the material together during the tucking operation, particularly when the covering material is of a type which is considered stiff (i.e. less flexible).

The gathering plate 161, at a location closely adjacent the apex of the gathering notch 163, preferably has a pressure member 167 mounted thereon so as to extend transversely across the narrow slot 166 at a location closely adjacent but typically spaced slightly rearwardly from the apex of the V-shaped notch 163. This pressure plate 167 can be formed as a separate small bar which is fixed to and extends transversely across the narrow slot 166, with the pressure bar 167 projecting vertically downwardly throughout only part of the height of the slot so as to enable the bunched corner flap (i.e. the tail) to be folded down and passed under this pressure bar when the gathering plate 161 is moved forwardly so as to pass over the corner structure of the workpiece as described below.

To control the vertical swinging position of the gathering plate, the front end of the drive cylinder 146 is pivotally coupled to a first clevis 168 fixedly coupled to the gathering plate 161 at a location more closely adjacent the front end thereof, and the other end of the pressure cylinder 146 (i.e. the leading end of the piston rod in the illustrated arrangement) is pivotally joined to a further clevis 169 fixed to the rear carriage plate 154. The cylinder 146 is preferably a double-acting fluid-pressure cylinder so as to be capable of pressurization in either direction for controlling swinging movement of the gathering plate about the pivot 144 between a lowered (i.e. active) position illustrated by FIGS. 25-26 and a raised (i.e. inactive) position illustrated by FIGS. 27-28. In the lowered or active position illustrated by FIGS. 25-26, the drive cylinder 146 is preferably maintained at least a low pressure to maintain downward bias on the gathering plate 162 so that the front part thereof remains in downward pressed contact with a suitable support surface, such as either the upper surface of the workpiece positioning structure 135 or the upper surface of the workpiece, depending upon the advanced or retracted position of the device 141, as explained below. It will be recognized, however, that this downward biasing of the gathering plate, particularly when in the active position, can also be achieved by other means, such as springs, if desired.

Considering the pre-tuck arrangement 147 as movably carried on the forward end of the tucking device 141, this pre-tucking arrangement includes an elongate arm, specifically a lever 171, which at a location intermediate its ends is joined to a generally horizontal pivot shaft 172, the latter being supported at its ends by a pair of generally parallel arms 173 which are fixed to and project forwardly from the carriage side plates 153. The lever 171 is vertically swingable within a generally vertical plane, and specifically the upright center plane, about the horizontal pivot axis defined by the pivot shaft 172. The pivot arm or lever 171 at its lower free end has a thin pre-trucking blade 174 stationarily carried thereon, which blade is removable and replaceable, and has a lower tucking edge 179 which at its leading end (i.e. the end facing the workpiece) has an arcuate and rounded configuration so as to facilitate its gradual movement into contact with the upstanding corner flap as the pre-tucking blade 174 is moved forwardly (leftwardly in FIGS. 25-26) due to clockwise swinging of the lever 171 about the pivot 172.

The pre-truck blade 174, when viewed in cross section (i.e., transverse to the central vertical plane of the tucking device) is formed generally as a thin plate-like member having a thickness, at least along the lower edge, which is less than the width of the slot 25 formed between the adjacent edge frame rails of the workpiece so as to enable the blade 174 to pass into and move lengthwise along the slot 25, while at the same time providing sufficient side clearance to accommodate at least two thicknesses of covering material.

Figure 25:
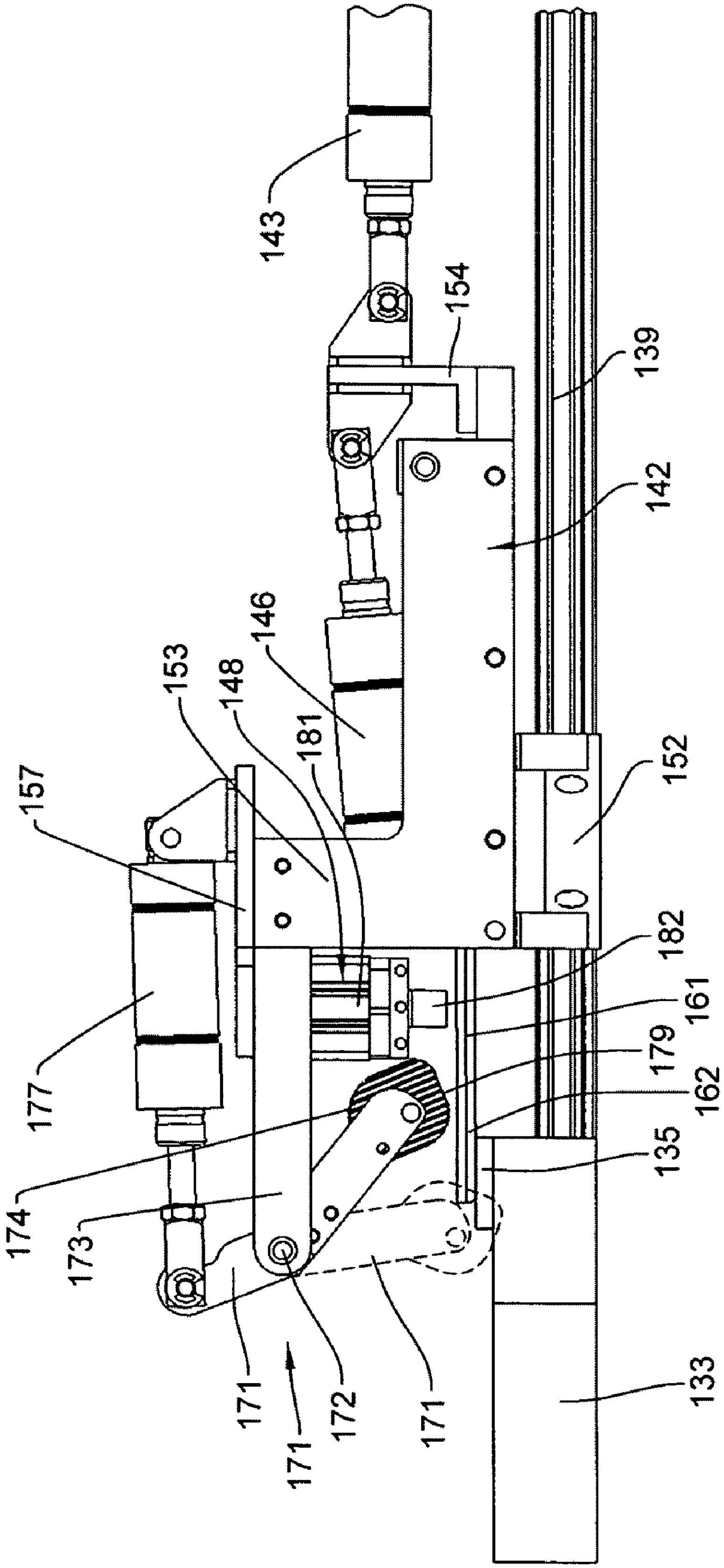
FIG. 25 is a side elevational view of the apparatus illustrated in FIG. 21, and showing the apparatus with the gathering member in its lowered retracted position.
Figure 26:
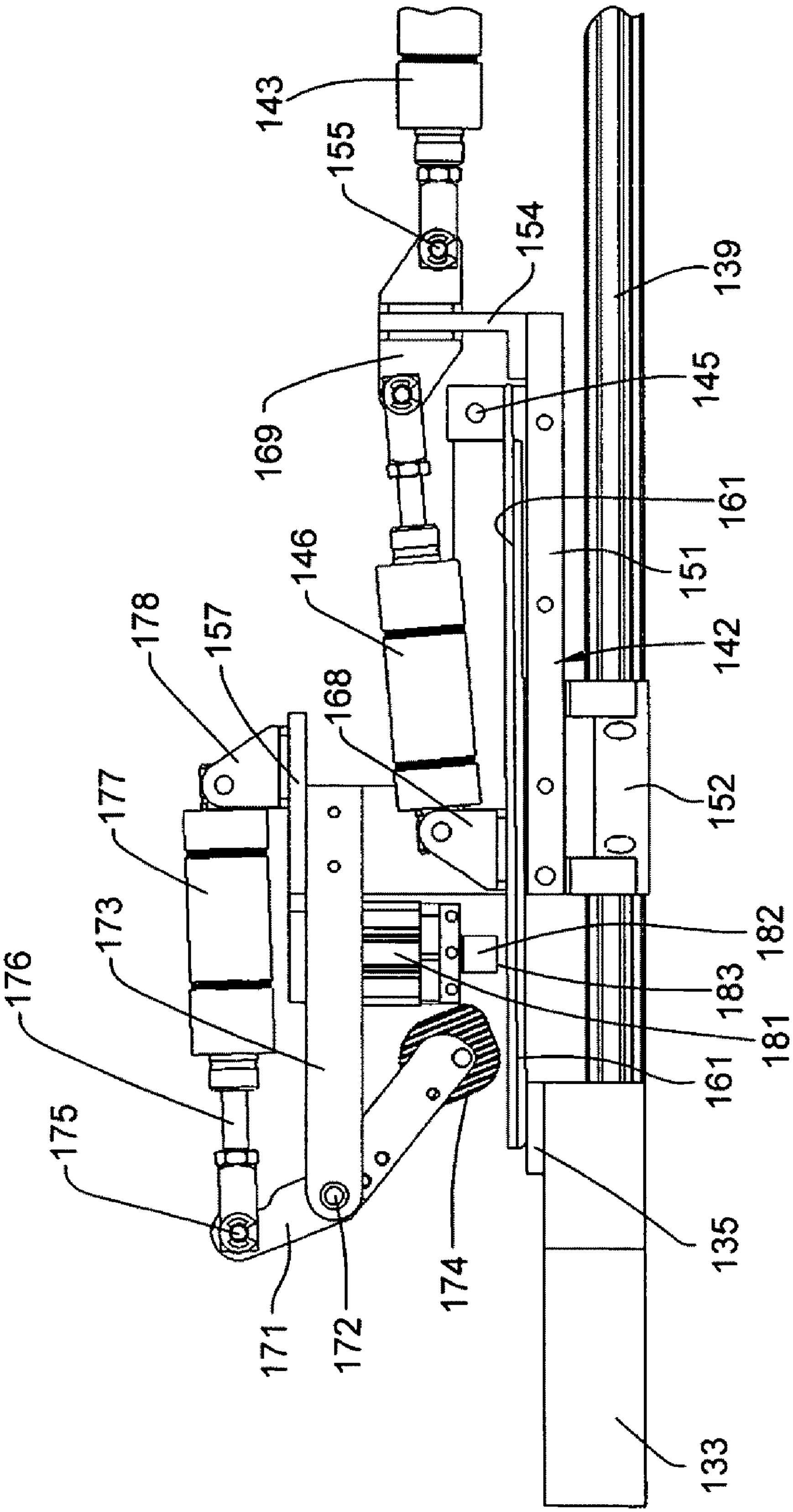
FIG. 26 is a side view similar to FIG. 25 but showing the apparatus with part of the carriage structure removed for clarity of illustration.

The pre-tuck lever 171, at its other (i.e. upper) end, is coupled by a pivot pin 175 to the front end of the drive device 177, specifically a fluid pressure cylinder. In the illustrated embodiment, the pivot 175 couples to the free end of the piston rod 176. The other end of the pressure cylinder 177 is pivotally coupled to a clevis 178 which is fixedly carried on and projects upwardly from the carriage top plate 157. The pressure cylinder 177 is preferably a double-acting cylinder so that when pressurized to retract the piston rod, the lever 171 is pivoted clockwise so that the pre-truck blade 174 is moved forwardly, such as into a forward or advanced position indicated by dotted lines in FIG. 25. Conversely, when the piston rod is retracted, such as by reverse energization of the pressure cylinder 177 (or alternately by means of internal return springs), the lever 171 is pivoted in the opposite (i.e. counter-clockwise) direction so as to return the pre-truck blade 174 back to its starting position wherein it is in its rearwardmost disposition substantially as illustrated by FIGS. 25-26.

The main tucking blade arrangement 148 is carried on the carriage 142 directly adjacent but rearwardly of the pre-tucking blade 174 when the latter is in its retracted position. This main tucking blade arrangement 148 includes a driving device 181, such as a fluid pressure cylinder, which is mounted to and projects vertically downwardly from the underside of the top carriage plate 154. This drive cylinder 181 has a downwardly projecting piston or actuator rod which, on the lower free end, mounts a thin tucking blade 182 which is generally vertically oriented and is disposed within the same central vertical plane so as to be generally aligned and co-planar with the pre-tuck blade 174. The main tucking blade 182 has a generally straight lower tucking edge 183 which is vertically aligned with and is adapted to pass vertically downwardly through the narrow apex slot 166 when the drive cylinder 181 is energized so as to push the tucking blade downwardly. The stroke of the drive cylinder 181 is such as to push the tucking blade 182 downwardly through the slot 166, causing it to not only contact the compact bundled material (i.e. the tail), but also push the tail downwardly so that at least part of it is forced into the slot 25 so that the material, upon passing vertically through the slot, accesses the enlarged open space below the slot and hence tends to expand, thereby causing the material to effectively interlock within the adjacent frame rails. This interlocking is further assisted by the fact that residual glue or adhesive may still remain on the corner flap material, and as such the adhesive will set up when moved into contact with the frame rails. The retraction of the tucking blade 182 may occur either due to reverse pressurization of the drive cylinder 181, or by providing the drive cylinder with suitable return springs for moving the piston rod upwardly.

Operation—FIGS. 21-28 Embodiment

The operation of the tucking device 131 illustrated by FIGS. 21-28 will now be briefly explained, particularly in conjunction for folding and securing the corner flap of a workpiece having a construction similar to that illustrated by FIGS. 5-6. In this regard, reference is also made to FIG. 29 which is a diagrammatic cross-sectional view which illustrates the retention slot 25 defined between the adjacent frame rails on the rear of the workpiece substrate, and the manner in which the bunched corner flap is pushed into and secured within the retaining slot 25.

Figure 24:
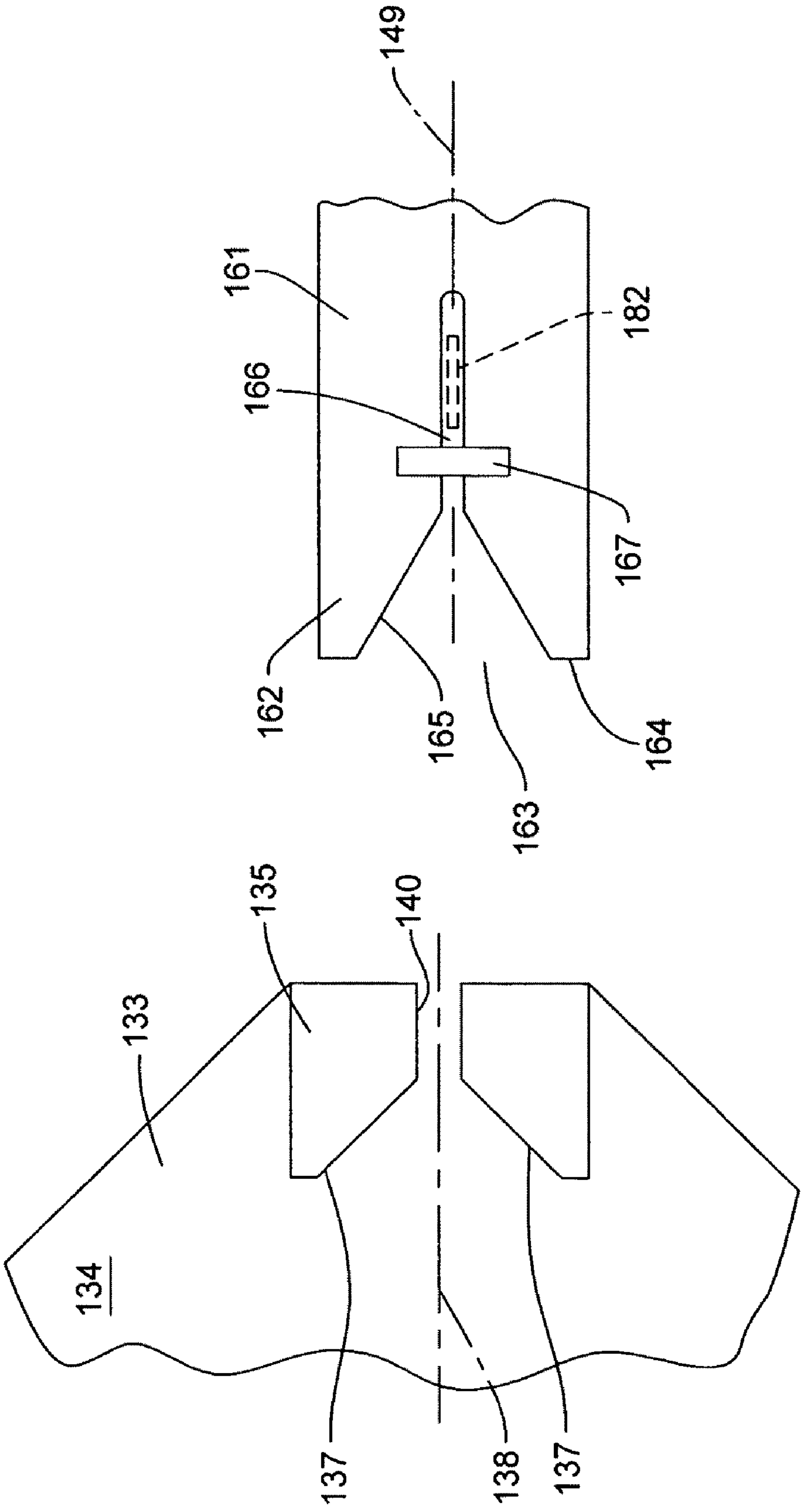
FIG. 24 is an enlarged, exploded, fragmentary top view showing the gathering plate and its relation to the corner positioning structure.

To initiate a tucking operation in association with a protruding corner flap located at one corner of a workpiece 10', the workpiece is positioned face down on the support table 133 and is snugly guided into the positioning notch 136 defined by the workpiece positioner 135, whereby the upwardly protruding corner flap is located adjacent the apex of the notch 136 and protrudes upwardly above the workpiece positioner. The workpiece positioner 135, as illustrated by FIG. 24, preferably has a clearance slot or space 140 which opens away from the apex of the positioning notch so as to accommodate the additional material defined by the corner flap located at the corner of the workpiece, and to also ensure that the workpiece positioner does not interfere with the forward movement of the pre-tuck blade, as described hereinafter.

After the workpiece has been positioned on the support table and snugly guided into and abutted within the corner-receiving positioning notch 136, suitable clamps as diagrammatically illustrated at 62 in FIG. 11 are either automatically or manually operated to stationarily clamp the workpiece in position on the work table. The corner tucking operation can now be initiated.

Figure 23:
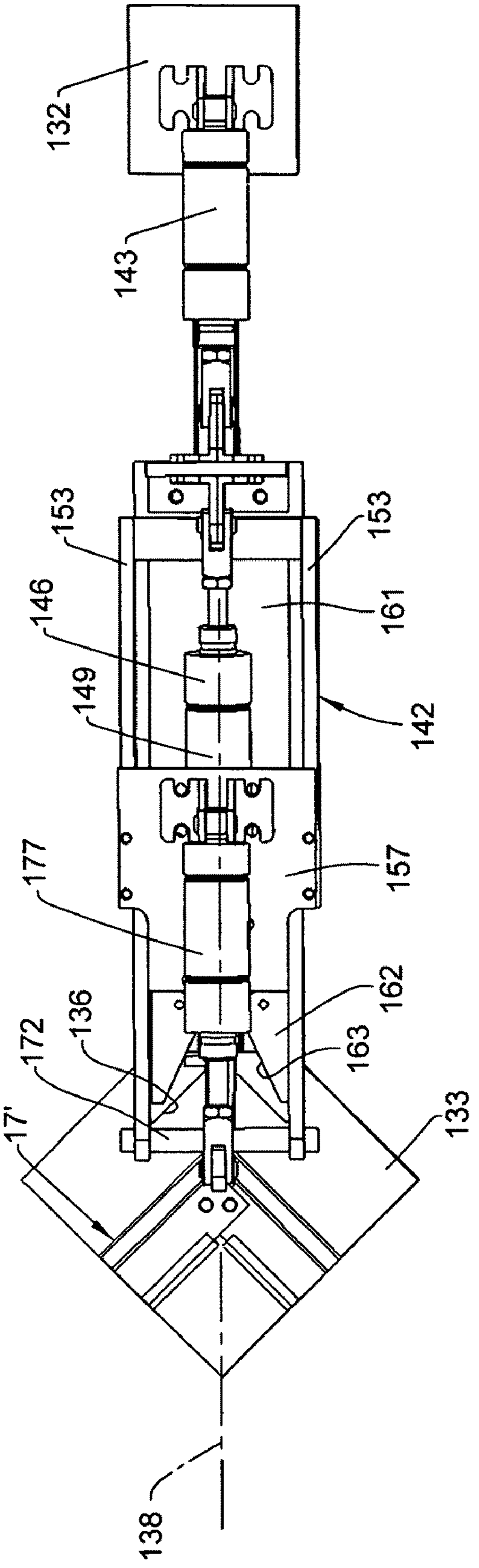
FIG. 23 is a top view of the apparatus illustrated in FIG. 21.
Figure 27:
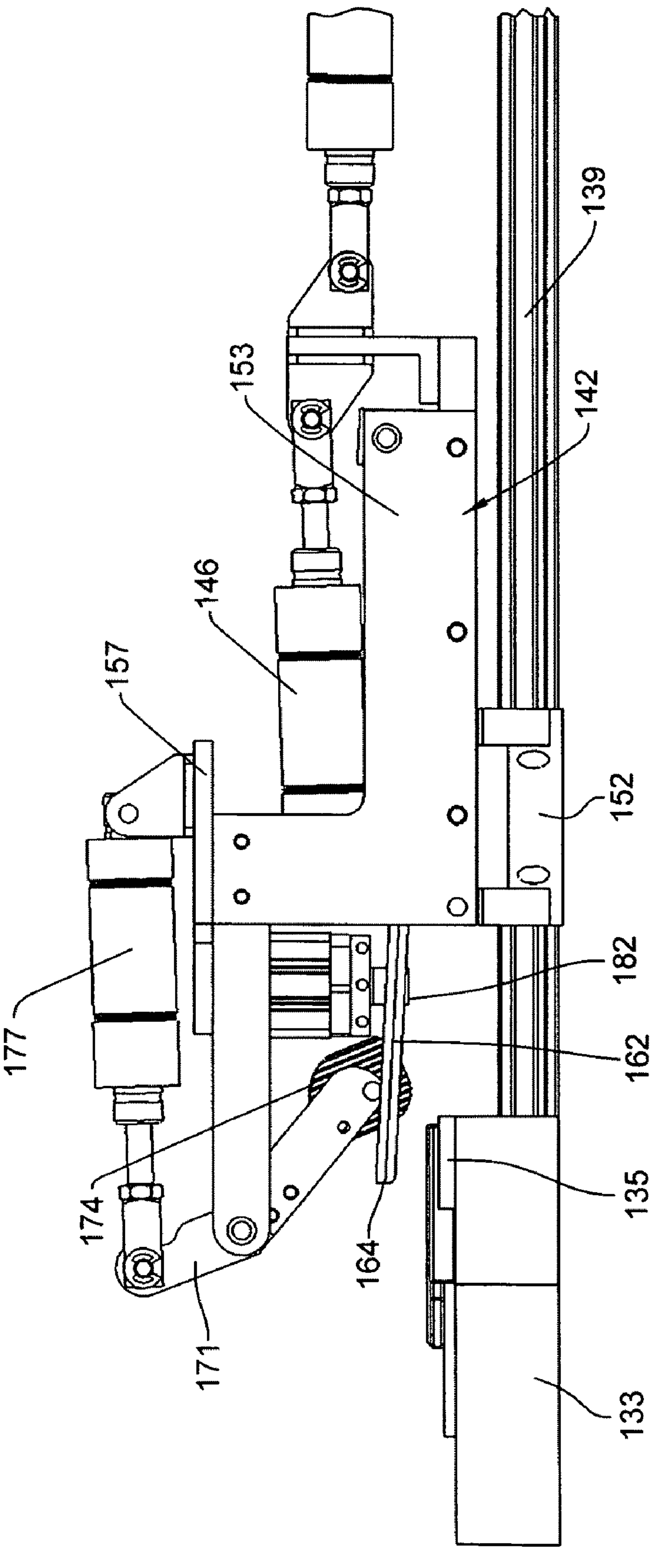
FIGS. 27 and 28 are side views which respectively correspond to FIGS. 25 and 26 but which show the gathering member in its raised inactive position.
Figure 28:
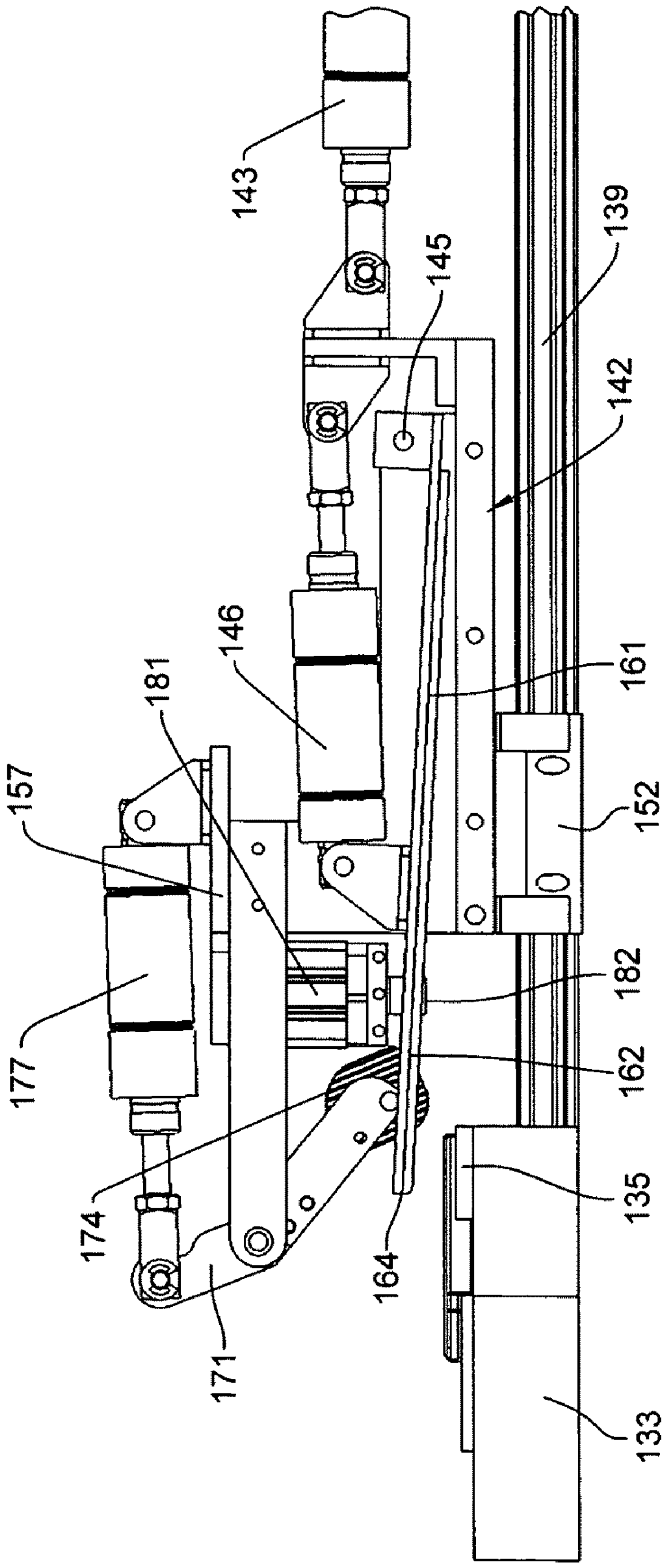
Figure 29:
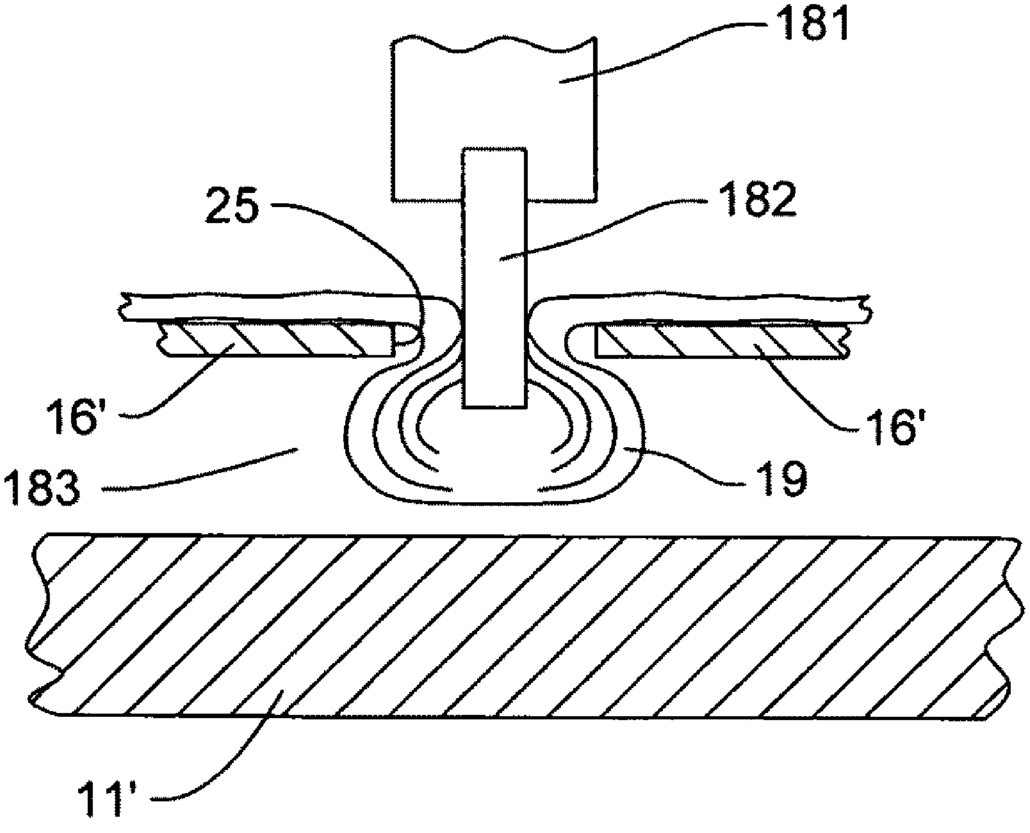
FIG. 29 is an enlarged fragmentary sectional view which illustrates the retaining slot defined between the adjacent frame rails of the workpiece, and which diagrammatically illustrates the manner in which the tail (i.e., the bunched corner flap) is retained within this structure.

The tucking device 141 is initially in its retracted and raised position, namely the carriage 142 and the gathering structure 144 carried thereon are in the retracted position illustrated by FIGS. 27-28, and the gathering member 161 is in the raised position as also illustrated by FIGS. 27-28. The tucking operation is initiated by initially energizing the pressure cylinder 146 which causes the gathering plate 161 to swing downwardly from the raised position of FIGS. 27-28 into the lowered operational position of FIGS. 25-26. In this latter position, the undersurface of the front end part 162 of the gathering plate 161 is pressed or biased into contact with the smooth upper surface of the workpiece positioning structure 135, but the positioning of the gathering member is such that the V-shaped gathering groove 163 thereof is spaced slightly outwardly (i.e. rearwardly) of the workpiece positioning notch 136 so that the gathering plate 161 does not initially overlap or contact the workpiece 10'. This relationship is illustrated by FIG. 23. At least some minimal downward pressure is maintained on the gathering plate 161, such as by the drive cylinder 146, to maintain a continuous downward bias or pressure contact with the upper surface of the workpiece positioner 135.

With the workpiece and the tucking device positioned as described above, the pre-tucking blade 174 is in its retracted position as illustrated by FIGS. 25-26, and is positioned closely adjacent but directly outwardly from the upwardly protruding corner flap.

The pressure cylinder 177 is then energized to cause swinging (clockwise in FIGS. 25-26) of arm 171, causing the pre-tuck blade 174 to be forwardly advanced, which forward advance is primarily horizontal with only a slight lowering of the pre-tuck blade due to the angular disposition of the support lever 171. As the pre-tuck blade 174 is moved forwardly, its blade-like shape initially contacts the exterior surface of the upstanding corner flap and, as the blade moves forwardly, the material of the corner flap has sufficient flexibility and freedom of movement so as to slide laterally across the blade, if necessary, so that the corner flap effectively at least partially re-centers itself relative to the pre-tuck blade, and this in addition causes the corner flap to be more properly centered relative to the retaining slot 25. The continued inward or advancing movement of the pre-tuck blade 174 causes the blade to begin to fold some of the corner flap material downwardly and, in addition, the blade begins to enter the retaining slot 25 through the outer end thereof, hence causing at least one thickness of the corner flap material to wrap around the blade and be pushed downwardly into the retaining slot 25. This hence effects not only proper positioning of the corner flap material, but also partial retention thereof with respect to the retaining slot 25. This forward movement of the pre-tuck blade 174 due to swinging of the support lever 171 continues until the pre-tuck blade has passed substantially entirely into the retaining slot 25 throughout the length thereof, substantially as illustrated by the dotted line position in FIG. 25, at which time the swinging lever arm 171 is stopped and is held in stationary position by appropriate pressurization of the drive cylinder 177. In this latter position, a significant amount of corner flap material is still in a relatively loose condition, as defined primarily by two folds of material which protrude upwardly on generally opposite sides of the pre-tuck blade 174.

The main driving cylinder 143 is then energized to cause controlled linear forward advance of the carriage 142 and of the gathering plate 161 and pre-tuck device carried thereon. The initial forward advancing movement of the gathering plate 161 causes the lead end 164 thereof to contact and slide upwardly onto the upper surface of the workpiece. In this regard, the workpiece will preferably have an overall height which is only slightly greater (for example, approximately 0.015 inch) greater than the height of the workpiece positioner 135. In addition, the lower corners of the leading end of the gathering plate are preferably rounded or chamfered to facilitate their ability to ramp or cam up onto the upper surface of the workpiece. The continued forward advancing movement of the carriage 142 and gathering plate 161 causes the pre-tuck blade 174 to continue to advance forwardly so that it ultimately passes entirely through the retaining slot 25. During this continued advance of the gathering plate 161, the remaining additional excess material of the corner flap is moved into contact with the converging side walls 165 of the gathering slot 163 so as to move this material into a rather tight or compacted bunch, namely a bunch having properties similar to a tail or rope, and this bunched tail progressively moves into the apex of the gathering groove and thence into the narrow apex slot 166. The continued forward movement of the gathering plate 161 causes the bunched tail of corner material to contact and then be initially folded down as it passes under the pressure bar 167. This forward advancing of the gathering plate 161 continues until the pressure bar reaches a point which is located adjacent or preferably slightly past the inner end of the retention slot 25, at which time the forward advance of the carriage 142 and gathering plate 161 is stopped by the control of the pressure cylinder 146. At this position, the gathered tail of material is disposed directly along the lower part of the narrow apex slot 166 and is positioned so as to extend directly along and protrude at least partially downwardly into the retaining slot 25.

During this latter-described movement, the pressure and forces applied to the corner flap material during its gathering within the gathering slot 163 and its folding and compaction as it passes under the pressure bar 167 exerts sufficient pulling force on the material to ensure that the material is tightly pulled up and around the workpiece corner as the excess material is folded downwardly and pressed at least partially into and along the retaining slot 25.

With the forward advance of the carriage and gathering plate now stopped, the main tucking device 148 is now activated. In this regard, the drive cylinder 181 is suitably pressurized whereby the tucking blade 182, which is positioned within the narrow apex slot 166 so that the lower blade edge extends over a significant portion of the retaining slot 25, is now pushed downwardly into contact with the bunched material tail, with additional and significant pressure being applied to the blade 182 by the cylinder 181 so that additional quantities of the material are forced downwardly into the retaining groove 25 over substantially the entire length thereof. As this bunched material is pushed downwardly into the retaining slot, some of the material passes vertically through the slot so as to move into the open space or region 183 (FIG. 29) as defined interiorly of the frame rails which define the opposed slot 25. This material tends to expand into this enlarged or interior space 183 so as to effectively lock or secure the folded compacted tail to the frame rails. In addition, since the material flap may also have residual adhesive thereon as a result of the earlier edge flap adhering operation, this adhesive, if still uncured, will itself cure and cause fixing not only of the material of the tail together, but may also cause fixed adhesive securement of the tail to the adjacent surfaces of the frame rails.

After appropriate insertion of the corner flap tail into the retaining slot 25 by the downward pressing movement of the main tucking blade 182, the drive cylinder 181 is reversely energized so as to retract the blade 181 upwardly into its original raised position.

Substantially simultaneous with or shortly after retraction of the main tucking blade 182, the drive cylinder 146 is energized to cause lifting or raising of the gathering plate 161 into its raised inactive position and, at about the same time, the drive cylinder 177 is also energized to cause the lever 171 and the pre-tuck blade 174 mounted thereon to be swung counter-clockwise back into their retracted positions.

The main drive cylinder 143 is then energized to retract the entire tucking device 141 rearwardly from its advanced position back into its original position, the latter as illustrated in FIGS. 27-28.

The clamps holding the workpiece in position on the support table are then released, and the workpiece can be removed from the support table, either manually or automatically, whereupon the next corner tucking operation can be initiated, either on a different corner of the same workpiece, or on a totally different workpiece.

While the arrangements illustrated herein relate to an apparatus which operates on a single corner of a workpiece, it will be understood that the overall apparatus can be provided with two or more tucking apparatuses positioned so as to permit multiple corners of a single workpiece to be simultaneously tucked. For example, the workpiece support table can be provided with four separate corner positioning structures associated therewith so as to simultaneously accommodate all four corners of the workpiece, with each positioning structure having its own tucking apparatus for permitting simultaneous operation on the respective workpiece corner. Further, it is preferred that at least three of the workpiece positioning guides, and their associated tucking apparatus, be adjustably positionable so as to enable the apparatus to readily adjust to and accommodate different sizes of workpieces, such as by permitting adjustment of the corner positioning devices and associated tucking devices to accommodate different lengths and/or widths of workpieces. Providing a table having a capability of permitting such movement and adjustment is believed to be within the skill of those who are familiar with movement and table structures so that further detailed descriptions thereof is believed unnecessary.

In the tucking devices of this invention, the gathering plate, at least throughout the forward or leading end thereof, preferably has a laminated construction defined by upper and lower plates which are co-extensive and overlie one another in fixedly joined relationship. The upper plate is preferably constructed of steel so as to provide the necessary strength and rigidity. The lower plate, however, is typically of a nonmetallic construction, preferably of a material such as plastic or wood so as to have a smooth but low friction bottom surface to enable this bottom surface to readily slide over the workpiece and specifically the covering material which comes into contact with the bottom surface of the gathering plate during the corner tucking operation, while at the same time creating little, if any, wear or other disadvantageous contact with the covering material.

While the embodiments of the tucking and fastening apparatus illustrated and disclosed herein utilize numerous fluid pressure cylinders for controlling various movements, it will be appreciated that other conventional drive devices, including drive devices employing springs for controlling return movement in one direction, can in many cases be substituted for pressure cylinders. In addition, the overall control of the devices is preferably automated to the maximum extent utilizing suitable electronic controls and software so as to provide optimum control over the operations with respect to all functions thereof including handling and cycling time.

Although particular preferred embodiments of the invention have been disclosed in detail for illustrative purposes, it will be recognized that variations or modifications of the disclosed apparatus, including the rearrangement of parts, lie within the scope of the present invention.

While the embodiments disclosed herein relate to a first variation wherein the gathered fabric tail is pressed against the rear side of the substrate and stapled thereto, and a second variation wherein the gathered fabric tail is pushed into a securing slot defined by a rear frame, it will be appreciated that modifications of the invention can be made while still incorporating desired aspects thereof. For example, the securing slot can be defined by a separate fastener or attachment provided on the back side of the panel or pad so as to be useable on a pad or panel which is not provided with a rear frame. As further variations, the substrate can be provided with a groove formed in the back side thereof for at least partially accommodating the folded fabric tail therein, with the tail being fixed in position within the groove by fasteners such as staples or by a type of insertable plug or retainer. In addition, the groove can be provided with an adhesive therein to further assist in securing the fabric tail to the pad or panel structure.

What is claimed is:

1. An apparatus for tucking and securing a corner flap of a flexible cover sheet which extends across a front face of a workpiece and has edge flaps which wrap around edges of the workpiece and are adhesively secured to a back side thereof while creating corner flaps of the cover sheet which extend along and project rearwardly at corners of the workpiece, comprising:

a support arrangement for stationarily holding a workpiece having a flexible cover sheet attached thereto and extending across a front face of the workpiece and corner flaps projecting rearwardly at corners of the workpiece;

said support arrangement including a corner positioning structure defining a recess for accommodating a corner of the workpiece to permit stationary positioning thereof;

said support arrangement also including a support surface for supportive engagement with an opposite-facing surface of said workpiece to transversely position said workpiece relative to said corner positioning structure;

a corner flap tucking apparatus positioned adjacent said corner positioning structure at a location adjacent but outwardly of said recess;

said corner flap tucking apparatus including a gathering plow movably supported adjacent said corner positioning structure and coupled to a first drive device which moves said plow forwardly from a retracted position wherein the plow is spaced outwardly from the workpiece into an advanced position wherein the plow is positioned over the corner of the workpiece, a forward end of said plow having a gathering notch for sidewardly gathering the corner flap into a more compact bundle as the plow moves forwardly over the workpiece;

a contact member mounted on said plow for contacting the bundle as the plow moves forwardly and for causing the bundle to be folded over into contact with a back side of the workpiece;

an activatable securing device for attaching the folded bundle to the workpiece when the plow is in said advanced position; and said plow being returned to said retracted position after said folded bundle is secured to said workpiece by said securing device.

2. An apparatus according to claim 1, wherein the gathering notch is generally V-shaped and opens from a forward end of the plow and converges to an apex along a direction which extends from said advanced position toward said retracted position, said plow having a narrow slot that extends away from the apex of said notch for confining the bundle therein as the plow moves forwardly, and said contact member being positioned in said slot for contacting said bundle as the plow is forwardly advanced.

3. An apparatus according to claim 1, wherein the recess in said corner positioning structure defines a generally V-shaped notch which defines an included angle of about 90° to permit snug accommodation of a corner of the workpiece therein, and wherein the notch in the plow defines an included angle which is less than the included angle of the corner positioning recess.

4. An apparatus according to claim 1, wherein the support arrangement includes a supporting table having a large upper surface on which said workpiece is positioned with said cover sheet disposed in contact with said upper surface, said corner positioning structure being positioned adjacent said upper surface and cantilevered upwardly therefrom through a height which approximately equals a thickness of said workpiece when the latter is supported on said upper surface.

5. An apparatus according to claim 1, wherein the corner flap tucking apparatus includes a carriage which is movably supported for back-and-forth movement between said retracted and advanced positions, said first drive device being drivingly connected to said carriage for effecting advancing movement thereof; and said gathering plow being supported on said carriage for movement therewith between said advanced and retracted positions;

said plow being movably supported on said carriage for vertical movement between raised and lowered positions, and a lifting arrangement coacting with the plow for controlling movement thereof between said raised and lowered positions, said lifting arrangement effecting lifting of said plow when the latter is in said advanced position to permit return movement thereof to said retracted position.

6. An apparatus according to claim 5, wherein said securing device is carried on said plow.

7. An apparatus according to claim 6, wherein said securing device is a stapler which ejects a staple for securing the folded bundle to the workpiece.

8. An apparatus according to claim 5, wherein the securing device is movably carried on said carriage, and a driving unit is coupled to said securing device for effecting movement thereof relative to said carriage.

9. An apparatus according to claim 8, wherein the securing device includes a pressing blade supported on said carriage for generally up and down movement, said blade being coupled to said driving unit and moved downwardly when said carriage is in said advanced position so as to move said blade downwardly into contact with the folded bundle to press part of the bundle downwardly into engagement with a retainer structure provided on the workpiece.

10. An apparatus according to claim 9, including a pre-tucking device movably mounted on the carriage at a location disposed forwardly of the pressing blade, said pre-tucking device including a pre-tuck blade which is positioned over the forward end of the plow and is moved forwardly by a driving arrangement as the plow is advanced to cause part of an upstanding corner flap to be partially folded down and inserted into the retainer structure on the workpiece.

11. An apparatus according to claim 10, wherein the pre-tuck device includes a lever supported for vertical swinging movement on said carriage, said pre-tuck blade being mounted on a lower free end of said lever, and said driving arrangement being connected to said lever to effect swinging thereof in a first direction causing the pre-tuck blade to be moved forwardly relative to the plow to effect contact and then initial insertion of a part of the corner flap into the retainer structure.

12. An arrangement according to claim 11, wherein said plow has a generally V-shaped gathering notch which opens from a forward end thereof and converges to an apex along a direction which extends from said advanced position toward said retracted position, said plow having a narrow slot that extends away from the apex of said notch for confining the bundle therein as the plow moves forwardly, and said contact member being positioned in said slot for contacting said bundle as the plow is forwardly advanced.

13. An arrangement according to claim 12, wherein the pressing blade is positioned to project vertically downwardly through the narrow slot at a location closely adjacent but rearwardly of said contact member.

14. An apparatus according to claim 13, wherein the pre-tuck blade is horizontally aligned with the pressing blade and is normally positioned generally within the gathering notch closely adjacent to the apex thereof but forwardly of the contact member.

15. An apparatus according to claim 1, wherein the securing device ejects a fastener into said workpiece for fixedly joining the folded bundle to the workpiece.

16. An apparatus according to claim 15, wherein the fastener is a staple.

* * * * *